United States Patent
Kirkegaard

(10) Patent No.: US 12,093,891 B2
(45) Date of Patent: *Sep. 17, 2024

(54) DECENTRALIZED LEDGER SUPPLY CHAIN PLANNING INTERCHANGE

(71) Applicant: Jon Kirkegaard, Aubrey, TX (US)

(72) Inventor: Jon Kirkegaard, Aubrey, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/297,056

(22) Filed: Apr. 7, 2023

(65) Prior Publication Data

US 2023/0316224 A1 Oct. 5, 2023

Related U.S. Application Data

(60) Division of application No. 16/798,367, filed on Feb. 22, 2020, now Pat. No. 11,636,425, and a
(Continued)

(51) Int. Cl.
*G06Q 10/087* (2023.01)
*G06Q 50/04* (2012.01)
(Continued)

(52) U.S. Cl.
CPC .......... *G06Q 10/087* (2013.01); *G06Q 50/04* (2013.01); *G06F 16/2379* (2019.01);
(Continued)

(58) Field of Classification Search
CPC ............................. G06Q 10/087; G06Q 50/04
See application file for complete search history.

(56) References Cited

U.S. PATENT DOCUMENTS

| 5,974,395 A | 10/1999 | Bellini et al. |
| 7,657,534 B2 | 2/2010 | Kirkegaard |
| (Continued) | | |

FOREIGN PATENT DOCUMENTS

| EP | 3428861 A1 | 1/2019 |
| WO | 03/046696 A2 | 6/2003 |
| (Continued) | | |

OTHER PUBLICATIONS

Narayanaswami, C. et al. "Blockchain anchored supply chain automation," in IBM Journal of Research and Development, vol. 63, No. 2/3, pp. 7:1-7:11, Mar.-May 2019, doi: 10.1147/JRD.2019.2900655. (Year: 2019).

(Continued)

*Primary Examiner* — Jacob C. Coppola
(74) *Attorney, Agent, or Firm* — Daniel J. Chalker; Edwin S. Flores; Chalker Flores, LLP

(57) ABSTRACT

A data structure for a decentralized ledger interchange object includes: a first data field containing an identifier for an item; a set of second data fields linked to the first data field, each second field containing one of a set of time periods; a set of third data fields, each third data field linked to a corresponding second data field, each third data fields containing a requested quantity of the item for a corresponding time period; and a set of fourth data fields, each fourth data field linked to the corresponding second data field, each fourth data field containing a committed quantity of the item for the corresponding time period. The decentralized ledger interchange object can used in a computer system, a computerized method for time-based manufacturing, a computerized method for time-based pricing and other systems, devices and methods.

21 Claims, 40 Drawing Sheets

Related U.S. Application Data continuation of application No. 16/798,366, filed on Feb. 22, 2020.

(60) Provisional application No. 62/809,552, filed on Feb. 22, 2019.

(51) Int. Cl.
  *G06F 16/23* (2019.01)
  *G06F 16/27* (2019.01)
  *G06F 16/28* (2019.01)
  *G06F 21/62* (2013.01)

(52) U.S. Cl.
  CPC ............ *G06F 16/273* (2019.01); *G06F 16/28* (2019.01); *G06F 21/6218* (2013.01); *G06Q 2220/00* (2013.01)

(56) References Cited

U.S. PATENT DOCUMENTS

| | | |
|---|---|---|
| 2010/0262581 A1 | 10/2010 | Kirkegaard |
| 2016/0098723 A1 | 4/2016 | Feeney |
| 2017/0262862 A1 | 9/2017 | Aljawhari |
| 2018/0012311 A1 | 1/2018 | Small et al. |
| 2018/0025181 A1 | 1/2018 | Barinov et al. |
| 2018/0108024 A1 | 4/2018 | Greco et al. |
| 2018/0285810 A1 | 10/2018 | Ramachandran et al. |
| 2018/0341915 A1 | 11/2018 | Narasimhan |
| 2018/0342007 A1 | 11/2018 | Brannigan et al. |
| 2019/0018878 A1 | 1/2019 | Nguyen et al. |
| 2019/0102850 A1 | 4/2019 | Wheeler et al. |
| 2019/0108482 A1 | 4/2019 | Vikas et al. |
| 2019/0147174 A1 | 5/2019 | Narasimhan et al. |
| 2019/0266553 A1 | 8/2019 | Jacobson et al. |
| 2019/0340269 A1 | 11/2019 | Biernat et al. |
| 2019/0340619 A1 | 11/2019 | Leong et al. |
| 2019/0362287 A1 | 11/2019 | Achkir |
| 2020/0258031 A1 | 8/2020 | Makhija et al. |

FOREIGN PATENT DOCUMENTS

| | | |
|---|---|---|
| WO | 2017/194976 A1 | 11/2017 |
| WO | 2017/201489 A1 | 11/2017 |
| WO | 2019/045739 A1 | 3/2019 |
| WO | 2019/175878 A1 | 9/2019 |
| WO | 2020/023441 A1 | 1/2020 |

OTHER PUBLICATIONS

Balasubramanyam, K. "Adaptation of Block Chain Technology in manufacturing sector," 2020 International Conference on Mainstreaming Block Chain Implementation (ICOMBI), 2020, pp. 1-13, doi: 10.23919/ICOMBI48604.2020.9203545. (Year: 2020).

Nakasumi, M. "Information Sharing for Supply Chain Management Based on Block Chain Technology," 2017 IEEE 19th Conference on Business Informatics (CBI), 2017, pp. 140-149, doi: 10.1109/CBI.2017.56. (Year: 2017).

Omar, I. A. et al. "Enhancing Vendor Managed Inventory Supply Chain Operations Using Blockchain Smart Contracts," in IEEE Access, vol. 8, pp. 182704-182719, 2020, doi: 10.1109/ACCESS.2020.3028031. (Year: 2020).

Balazs, I. G. et al. "The data in supply chain management," 2012 IEEE 10th International Symposium on Applied Machine Intelligence and Informatics (SAMI), 2012, pp. 125-130, doi: 10.1109/SAMI.2012.6208942. (Year: 2012).

BPI objects flow directly into and out of the planning service repository using the planning templates to partners in a synchronized manner

FIG. 7A
Generic BPI object moving in a block

Microsoft Excel - Plan_02272003_151520

File  Edit  View  Insert  Format  Tools  Data  Window  SOP  Help

SOP menu:
- View ▸
- Plan ▸ — Forecast ▸
- Help ▸ — Generate Demand Plan
- Generate Master Plan
- Generate Build Plan, PO
- Generate Inventory Bridge A1  fx  ~Build Plan for SPG Home Net

| # | A | C | F | G | H | I | | | | M | N |
|---|---|---|---|---|---|---|---|---|---|---|---|
| 1 | ~Build Plan for SPG Home Networking for 2/24/2003 | | | | | | | | | | |
| | | | 2/24-3/2 | 3/3-3/9 | 3/10-3/16 | 3/17-3/23 | | | | /20 | 4/21-4/27 |
| 4 | 936-1001- | EDIMAX-10 | | | | | | | | 390 | 630 |
| 5 | 936-1012- | EDIMAX-103620 | | | | | | | | | |
| 6 | 936-1019- | EDIMAX-103620 | | | | | | | | 1420 | 2780 |
| 7 | 936-1020- | EDIMAX-103620 | | | | | | | | | |
| 8 | 936-1021- | BROMAX-103862 | | | | 1390 | 845 | 835 | 835 | 875 | 875 |
| 9 | 936-1022- | BROMAX-103862 | | | | 7620 | 575 | 565 | 570 | 595 | 595 |
| 10 | 936-1023- | ACCTON-102731 | | | | | | | | | |
| 11 | 936-1024- | BROMAX-103862 | | | | | | | | | |
| 12 | 936-2005- | EDIMAX-103620 | | | | 2005 | 250 | 240 | 250 | 255 | 255 |
| 13 | 936-2105- | EDIMAX-103620 | | | | | | | | | |
| 14 | 936-2108- | EDIMAX-103620 | | | | | | | | 185 | 210 |
| 15 | 936-2116- | EDIMAX-103620 | | | | | | | | | |
| 16 | 936-2206- | SMARTANT-104074 | | | | 3535 | 315 | 310 | 315 | 325 | 325 |
| 17 | 936-2501- | BROMAX-103862 | | | | | | | | | |
| 18 | 936-2502- | BROMAX-103862 | | | | | | | | | |
| 19 | 936-2510- | SERCOMM-102987 | | | | | | | | | |
| 20 | 936-2521- | BROMAX-103862 | | | | | | | | 175 | 365 |
| 21 | 936-2524- | SERCOMM-102987 | | | | | | | | | |
| 22 | 936-2602- | ACCTON-102731 | | | | 17450 | 1185 | 1165 | 1170 | 1225 | 1225 |
| 23 | 936-2625- | ASKEY-103811 | | 5000 | | | | | | | |
| 24 | 936-2694- | ASKEY-103811 | | 9000 | | | | | | | |
| 25 | 936-3510- | EDIMAX-103620 | | | | | | | | | |
| 26 | 936-3520- | EDIMAX-103620 | | | | | | | | | 5 |
| 27 | 936-3530- | EDIMAX-103620 | | | | | | | | | |
| 28 | 936-6101- | AMBIT-102927 | | | | | | | | | |
| 29 | 936-9200- | EXCELSUS-100457 | | | | | | | | | |
| 30 | 936-9230- | EXCELSUS-100457 | | | | | | | | | |
| 31 | 936-9333- | EXCELSUS-100457 | | | | 385 | 100 | 100 | 105 | 105 | 105 |
| 32 | | | | | | | | | | | |
| 33 | | | | | | | | | | | |
| 34 | | | | | | | | | | | |
| 35 | | | | | | | | | | | |

Plan Parameters / Buying Prices / Historical Inventory / Channel Inventory / Purchase Plan Ready

TO FIG. 7B

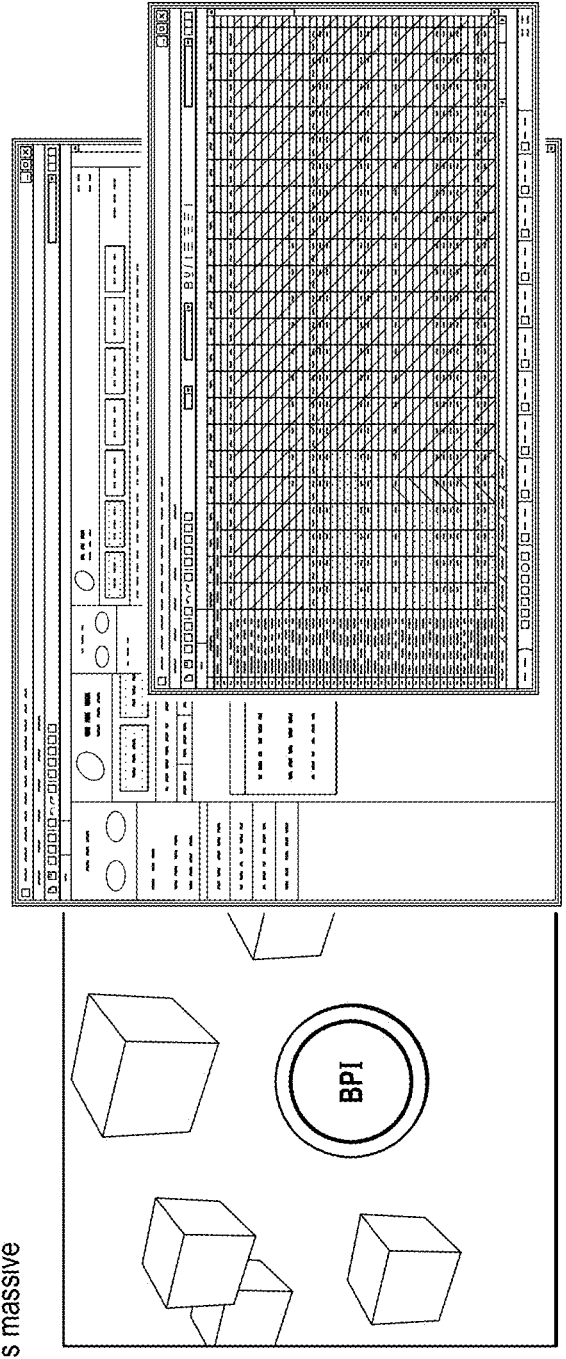
FIG. 12

Plan_02202005_193646 [Compatibility Mode] - Excel

FILE | HOME | INSERT | PAGE LAYOUT | FORMULAS | DATA | REVIEW | VIEW | ADD-INS

SECURITY WARNING  Macros have been disabled.  Enable Content

A29    fx  12A-5100-502

| | A | E | F | G | H | I | J | K | L | M |
|---|---|---|---|---|---|---|---|---|---|---|
| 1 | ~Master Plan for SPG Hardware for 4/7/2003 | | | | | | | | | |
| 2 | ~ | | | | | | | | | |
| 3 | 059-E141-A01 | 4/7-4/13 | 4/14-4/20 | 4/21-4/27 | 4/28-5/4 | 5/5-5/11 | 5/12-5/18 | 5/19-5/25 | 5/26-6/1 | 6/2-6/8 |
| 4 | Demand | 4645 | 4667 | 4667 | 4581 | 4516 | 4516 | 4516 | 4538 | 4667 |
| 6 | Backlog | | | | | | | | | |
| 7 | Frontlog | | | | | | | | | |
| 8 | On-Hand | 32823 | | | | | | | | |
| 9 | PO/In-transit | | | | | | | | | |
| 10 | Inventory (Tgt-Wks) | 4 | 4 | 4 | 4 | 4 | 4 | 4 | 4 | 4 |
| 11 | Supply Plan | | | | | | | | | 27030 |
| 12 | Mode | | | | | | | | | Ocean |
| 13 | Inventory (Projected) | 28178 | 23511 | 18844 | 14263 | 9747 | 5231 | 715 | (3823) | 18540 |
| 14 | Inventory (Proj-Wks) | 6 | 5 | 4 | 3 | 2 | 1 | 0 | -1 | 4 |
| 15 | | | | | | | | | | |
| 16 | 12A-5100-006 | 4/7-4/13 | 4/14-4/20 | 4/21-4/27 | 4/28-5/4 | 5/5-5/11 | 5/12-5/18 | 5/19-5/25 | 5/26-6/1 | 6/2-6/8 |
| 17 | Demand | 4667 | 4667 | 4667 | 4581 | 4516 | 4516 | 4516 | 4538 | 4667 |
| 19 | Backlog | | | | | | | | | |
| 20 | Frontlog | | | | | | | | | |
| 21 | On-Hand | 22 | | | | | | | | |
| 22 | PO/In-transit | | | | | | | | | |
| 23 | Inventory (Tgt-Wks) | | | | | | | | | |
| 24 | Supply Plan | 4645 | 4667 | 4667 | 4581 | 4516 | 4516 | 4516 | 4538 | 4667 |
| 25 | Mode | | | | | | | | | |
| 26 | Inventory (Projected) | 0 | 0 | 0 | 0 | 0 | 0 | 0 | 0 | 0 |
| 27 | Inventory (Proj-Wks) | 0 | 0 | 0 | 0 | 0 | 0 | 0 | 0 | 0 |
| 28 | | | | | | | | | | |

◄ ► ... | Master Plan | Build Plan | Inventory Bridge | Purchase Plan | Planning Items

READY

| | N | O | P | Q | R | S | T | U | V | W | X | Y |
|---|---|---|---|---|---|---|---|---|---|---|---|---|
| | 6/9-6/15 | 6/16-6/22 | 6/23-6/29 | 6/30-7/6 | 7/7-7/13 | 7/14-7/20 | 7/21-7/27 | 7/28-8/3 | 8/4-8/10 | 8/11-8/17 | 8/18-8/24 | 8/25-8/ |
| | 4667 | 4667 | 4667 | 4538 | 4516 | 4516 | 4516 | 4516 | 4516 | 4516 | 4516 | 45 |
| | 4 | 4 | 4 | 4 | 4 | 4 | 4 | 4 | 4 | 4 | 4 | 4 |
| | 4515 | 4520 | 4515 | 4515 | 4515 | 4515 | 4520 | 4515 | 4665 | 4670 | 4665 | 46 |
| | Ocean | Ocean | Ocean | Ocean | Ocean | Ocean | Ocean | Ocean | Ocean | Ocean | Ocean | Ocean |
| | 18388 | 18241 | 18089 | 18066 | 18065 | 18064 | 18068 | 18067 | 18216 | 18370 | 18519 | 1866 |
| | 4 | 4 | 4 | 4 | 4 | 4 | 4 | 4 | 4 | 4 | 4 | 4 |
| | 6/9-6/15 | 6/16-6/22 | 6/23-6/29 | 6/30-7/6 | 7/7-7/13 | 7/14-7/20 | 7/21-7/27 | 7/28-8/3 | 8/4-8/10 | 8/11-8/17 | 8/18-8/24 | 8/25-8/ |
| | 4667 | 4667 | 4667 | 4538 | 4516 | 4516 | 4516 | 4516 | 4516 | 4516 | 4516 | 45 |
| | 4667 | 4667 | 4667 | 4538 | 4516 | 4516 | 4516 | 4516 | 4516 | 4516 | 4516 | 45 |
| | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |

| BOM | Suppliers | Sales Force Forecast | ...

| | J | K | L | M | O | P |
|---|---|---|---|---|---|---|
| | Inventory Bridge ($) | | Inventory Bridge (units) | | | |
| | On-Hand 4/1/2003 | 1093973 | On-Hand 4/1/2003 | 32832 | | |
| | Receipts | 0 | Receipts | 0 | | |
| | In-Transits | 0 | In-Transits | 0 | | |
| | Open PO | 6649959 | Open PO | 188600 | | |
| | Supply Plan | 8537504 | Supply Plan | 285380 | | |
| | Actual Sales | 0 | Actual Sales | 0 | | |
| | Backlog | 3188440 | Backlog | 88787 | | |
| | Forecast | 11122393 | Forecast | 371344 | | |
| | Projected Inventory 6/ | 1970603 | Projected Inventory 6/ | 46672 | | |
| | Forecast 7/1/2003-9/ | 13452254 | Forecast 7/1/2003-9/ | 441061 | | |

Purchase Plan | Planning Items | BOM | Su...

4:12 PM 2/11/2018

| FIG. 24A | FIG. 24B | FIG. 24

FIG. 24A

| | A | C | F | G | H | I | J | K | L | M | N |
|---|---|---|---|---|---|---|---|---|---|---|---|
| 1 | ~Build Plan for | SPG Hardware for 4/7/2003 | | | | | | | | | |
| 2 | ~ | | | | | | | | | | |
| 3 | | | 4/7-4/13 | 4/14-4/20 | 4/21-4/27 | 4/28-5/4 | 5/5-5/11 | 5/12-5/18 | 5/19-5/25 | 5/26-6/1 | 6/2-6/8 |
| 4 | 059-E141-A01 | ASKEY-103811 | | | | 27030 | 4515 | 4520 | 4515 | 4515 | 4515 |
| 5 | 12A-5100-502 | ASKEY-103811 | 34650 | 34650 | 34650 | 95215 | 63575 | 26075 | 26075 | 25355 | 25230 |
| 6 | 13A-5200-117 | ASKEY-103811 | | | | 61955 | 3570 | 3570 | 3570 | 3475 | 3455 |

| O | P | Q | R | S | T | U | V | W | X | Y |
|---|---|---|---|---|---|---|---|---|---|---|
| 6/9-6/15 | 6/16-6/22 | 6/23-6/29 | 6/30-7/6 | 7/7-7/13 | 7/14-7/20 | 7/21-7/27 | 7/28-8/3 | 8/4-8/10 | 8/11-8/17 | 8/18-8/22 |
| 4515 | 4520 | 4515 | 4665 | 4670 | 4665 | 4665 | 4560 | 4515 | 4520 | 45 |
| 25235 | 25235 | 25235 | 25235 | 25230 | 25235 | 25235 | 26075 | 26075 | 26075 | 260 |
| 3455 | 3455 | 3455 | 3455 | 3455 | 3455 | 3455 | 3570 | 3570 | 3570 | 35 |

FROM FIG. 24A

| BOM | Suppliers | Sales Force Forecast |

2:40 PM 2/11/2018

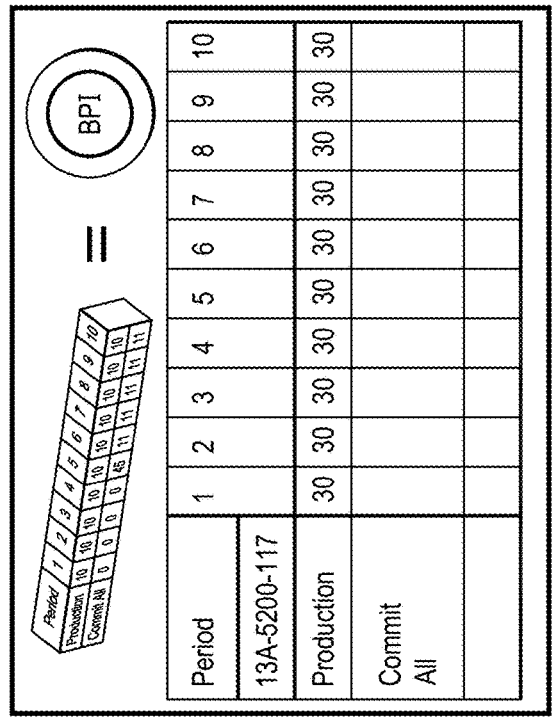

Underlying Magic

*DCRA Decentralized Supply Chain Solutions*

We Have Created the BPI ("Blockchain Planning Interchange") the "DNA" or Building "block" for Managing DECENTRALIZED Virtual Inventory

- ENHANCEMENTS TO PATENTS MR. KIRKEGAARD DEVELOPED IN 1996 AND 2005
- NEW 2018 PATENT PENDING BPI (BLOCKCHAIN PLANNING INTERCHANGE)
- SELF REPLICATING, CONSOLIDATING DECENTRALIZED "EDI" FOR PRODUCTION ARRAYS
- BPI = BLOCKCHAIN PLANNING INTERCHANGE
- ALLOWS PRODUCTION TO BE DESCRIBED AUTONOMOUS LOOSELY COUPLED OBJECT
- ENABLED BY BLOCKCHAIN DISTRIBUTED MANAGEMENT
- COMPATIBLE WITH ANY EXISTING PLANNING OR ERP "OFF CHAIN" TECHNOLOGY
- BPI "LEGO" BLOG FOR ADVANCED SOLUTIONS www.DCRASolutions.com   DCRA Inc. Confidential DT Distr.   214 555 0868

FIG. 31

DECENTRALIZED LEDGER SUPPLY CHAIN PLANNING INTERCHANGE

CROSS-REFERENCE TO RELATED APPLICATIONS

This application is: (1) a divisional application of U.S. patent application Ser. No. 16/798,367 filed on Feb. 22, 2020 entitled Distributed Ledger Planning Interchange, and (2) a continuation application of U.S. patent application Ser. No. 16/798,366 filed on Feb. 22, 2020 entitled Distributed Ledger Planning Interchange. Both of the foregoing applications claim priority to U.S. provisional patent application Ser. No. 62/809,552 filed on Feb. 22, 2019 and entitled Distributed Ledger Planning Interchange, the contents of which are hereby incorporated by reference in their entirety.

STATEMENT OF FEDERALLY FUNDED RESEARCH

This application is not the subject of any federally sponsored research or development.

TECHNICAL FIELD OF THE INVENTION

The present invention relates in general to the field of supply chain management, and more particularly, to a distributed ledger planning interchange.

BACKGROUND OF THE INVENTION

Without limiting the scope of the invention, its background is described in connection with supply chain management and in particular Sales and Operation Planning (S&OP).

Activities in supply chains make up two thirds of the global GDP. That is 54 Trillion dollars of activity. Although many activities make up these supply chains, it is quite reasonable to state the heart of any supply chain is production, manufacturing and the enabler of any single plant is its supply chain production plan. Although there has been progress in sharing finished inventory levels, selling others inventory (Amazon) or categorizing and tracking inventory in a warehouse, there has been essentially zero progress in the last twenty years in coordinating production plans between facilities, entities, companies and geographies.

Nearly all this work is still done manually on spreadsheets, emails, white boards and phone calls. This is despite possibly billions of dollars invested in enterprise ERP, planning technology and various forms of communications technologies. While in theory, a centralized technology architecture is OK for an enterprise, it is fundamentally flawed as all enterprise operate outside their financial accounting domain to some degree and many operate completely outside their accounting domain (nearly 100% outsourced). In the last ten years, a few firms have attempted to become a centralized "exchange" for supply chain production and inventory, but they have failed mostly due to the fact that by the time is data is copied and shared in a third party location it is stale, old, disjointed and suboptimal, which leads to excessive working capital and capacity contingency buffers. Despite bold promises by waves of technologies since the Internet exploded on the scene, most of this cross-enterprise coordination of production is done via emailing of spreadsheets, whiteboards and phone calls. This lack of a flexible loosely coupled exchange is a major constraint to growth of industry productivity and reduction of working capital exposure in companies of all sizes and all industries.

U.S. Pat. No. 5,974,395 discloses a system for extended enterprise planning across a supply chain. The system includes transactional execution system layers for a demand enterprise and a supply enterprise. First and second federated electronic planning interchange layers provide a data specification format and an external communication interface for transactional execution System layers. A supply chain planning engine, operable to perform planning for the Supply chain, is in communication with a third federated electronic planning interchange layer which provides a data specification format and an external communication interface for the supply chain planning engine. A data access/transfer layer interconnects and allows transfer of information between the first, second and third electronic federated planning interchange layers. The supply chain planning engine, the first transactional execution system and the second transactional execution system can thereby communicate data which the supply chain planning engine can use to provide constraint based extended enterprise planning across the supply chain.

U.S. Pat. No. 7,657,534 and U.S. Patent Application Publication No. 2010/0262581 disclose an order commitment method and system. The method includes the steps of identifying services and data capable of supporting an order commitment (or recently called Sales and Operations Execution (SOE)), and mapping the services to enable synchronized on-demand queries. The mapping step includes determining relationships among the services and the data and maintaining the relationships, wherein links are established to create fulfillment information. The method also includes using the fulfillment information to generate the order commitment.

The foregoing patents are hereby incorporated by reference in their entirety.

SUMMARY OF THE INVENTION

The present invention provides a BPI (blockchain planning interchange) object or standard blockchain definition that can be used in a master production plan (e.g., a spreadsheet, a database controlled planning system, etc.) that an entity wishes to communicate and receive a commitment on. In its broadest form it is a portion of data in an array. For example, a portion of a multiparty spreadsheet can be disseminated, acted on and then communicated back to the original owner with the appropriate time stamps, version stamps, permissions, hierarchy of importance such that an off chain application can reassemble it back to its original form but with the feedback and knowledge of the loosely coupled distributed/decentralized participants. This loosely coupled spreadsheet-like object is highly differentiated from centralized systems sharing a spreadsheet using online database record and cell locking technologies.

The BPI object and similar objects can be used for open purchase orders, available inventory, in-transit inventory, open orders that become instantiated in blocks to create a time synchronized record of key execution data and planning data for all nodes in the block (e.g., companies, planning locations, etc.). Thus, by simply using the blockchain data-sharing ecosystem this time synchronized and scrubbed data warehouse of data becomes available for a node. These nodes are thus infinitely scalable up or down based on sharing and synchronization of core data. The BPI object provides tremendous amounts of key production data and forecast data to be uncovered when needed and connected to the decentralized S&OP process and decentralized planning tools. This improves overall customer service and provides efficient use of working capital and assets.

In one embodiment of the present invention, a non-transitory computer readable medium that when executed by a processor provides a data structure for a decentralized ledger interchange object, which is also referred to as the BPI object. The decentralized ledger interchange object includes: a first data field containing an identifier for an item; a set of second data fields linked to the first data field, each second field containing one of a set of time periods; a set of third data fields, each third data field linked to a corresponding second data field, each third data fields containing a requested quantity of the item for a corresponding time period; and a set of fourth data fields, each fourth data field linked to the corresponding second data field, each fourth data field containing a committed quantity of the item for the corresponding time period.

In one aspect, the data structure further includes a set of fifth data fields, each fifth data field linked to the corresponding second data field, each fifth data field containing a price for the corresponding time period. In another aspect, the data structure further includes one or more sixth data fields linked to the first data field, each sixth data field containing one or more terms and conditions, one or more specifications for the item, a shipping and handling price, a tax amount, a link to other data or information stored remotely, or a link to other decentralized ledger interchange objects. In another aspect, the first data field, the set of second data fields, and the set of third data fields are filled in by a first processor, and the set of fourth data fields are filled in by a second processor. In another aspect, the first data field, the set of second data fields and the set of third data fields, and the set of fourth data fields are configured for automatic input into or export from a sales and operations planning system. In another aspect, the first data field, the set of second data fields and the set of third data fields, and the set of fourth data fields are configured for automatic input into or export from a sales plan, an inventory plan, a customer lead time plan, a new product development plan, a strategic initiative plan, or a financial plan. In another aspect, the first data field, the set of second data fields and the set of third data fields, and the set of fourth data fields are configured for automatically updating an electronic commerce application. In another aspect, the identifier for the item comprises a stock keeping unit number, a production unit number, a part number, or a model number. In another aspect, the decentralized ledger interchange object is configured for use in a decentralized ledger. In another aspect, the decentralized ledger can be hyper ledger, blockchain, quorum or other known or unknown decentralized ledger. In another aspect, the decentralized ledger interchange object is detachable from the decentralized ledger. In another aspect, the detached decentralized ledger interchange object is reconcilable back to a source of the decentralized ledger interchange object. In another aspect, the detached decentralized ledger interchange object is synchronized with other information without a link to the source of the decentralized ledger interchange object. In another aspect, the decentralized ledger interchange object is an asynchronous data object that is self-reconciling.

Tools have been developed to extract, transform and load the BPI object in and out of the source and destination planning systems. This could be as simple as transposing the BPI block object to a spreadsheet CSV file or other format that maintains the array structure in and out of source and target systems.

The foundation of the BPI object is the ability to break down any material (inventory production) plan for any purpose into a lowest common denominator (much like DNA is the basis of genetic material, the BPI object is the basis of the material plan). However this BPI object can be transmitted, reassembled with others into any S&OP or other material planning system. The breakthrough of this process is similar to the breakthrough of ANSI and EDIFACT electronic data exchange but focused on more complex array-based information that requires time-based reconciliation. This basic array of plan data is the foundation of any material planning, manufacturing scheduling, manufacturing planning, supply chain planning and in particular S&OP planning system. The BPI object opens up the ability for planning systems from any source, such as a simple spreadsheet to an expensive in memory dedicated supply chain planning system, to interchange inputs and outputs rapidly. Furthermore, this rapid interchange can become conversational allowing for business owners, planners and customers to test feasibility of plans vs. lead times and quantities exponentially faster. To be clear this is not "real time" but more in the vein of people time. This allows for the same request, promise, proforma testing then commitment that people need and want to make business and operational commitments. In summary, BPI object connected to decentralized blockchain or other networks provides for a conversational request and promise negotiation and updates between buyers and sellers dramatically improving efficiency of the entire supply chain network system.

In another embodiment of the present invention, a computer system that uses a decentralized ledger includes: a first computer system comprising one or more first processors; one or more second computer systems, each second computer system comprising one or more second processors; the one or more first processors (a) generate a first decentralized ledger interchange object, (b) generate a first block for the first decentralized ledger interchange object, (c) insert the first block onto the decentralized ledger, and (d) make the first block visible to the one or more second computer systems; the one or more second processors (a) access the first decentralized ledger interchange object in the first block of decentralized ledger, (b) generate a second decentralized ledger interchange object based on the first decentralized ledger interchange object, (c) generate a second block for the second decentralized ledger object, (d) insert the second block onto the decentralized ledger, and (e) make the second block visible to the first computer system; and the first and second decentralized ledger interchange objects comprise an identifier for an item, a set of time periods, a requested quantity of the item for each time period, and a committed quantity of the item for each time period.

In one aspect, the first and second decentralized ledger objects further comprise a price for each time period. In another aspect, the first and second decentralized ledger objects further comprise one or more terms and conditions, one or more specifications for the item, a shipping and handling price, a tax amount, a link to other data or information stored remotely, or a link to other decentralized ledger interchange objects. In another aspect, the one or more first processors generate at least one cryptographic key for the second computer system, and encrypt the first block using the cryptographic key, and the cryptographic key enables the one or more second processors to view blocks on the distributed ledger and to insert blocks onto the distributed ledger. In another aspect, the one or more first processors input the identifier for the item, the set of time periods, and the requested quantity of the item for each time period into the first decentralized ledger interchange object, and the one or more second processors input the committed quantity of the item for each time period into the second decentralized ledger interchange object. In another aspect, the one or more first processors generate the first decentralized ledger interchange object using data from a sales and operations planning system, and update the sales and operations planning system using data from the second decentralized ledger interchange object. In another aspect, the one or more first processors reconcile and synchronize the second decentralized ledger object received from multiple second computer systems. In another aspect, the first decentralized ledger object and the second decentralized ledger object are automatically input into or exported from a sales plan, an inventory plan, a customer lead time plan, a new product development plan, a strategic initiative plan, or a financial plan. In another aspect, the first decentralized ledger object and the second decentralized ledger object a exported to a static non-network production system or supply chain system as a direct data feed to synchronize future inventory requirements from another party, source, block, node or location. In another aspect, the second decentralized ledger object is used to automatically update an electronic commerce application. In another aspect, the decentralized ledger is used as a source of data in a manufacturing process, a supply chain, a sales and operations planning time series plan, or a schedule.

The emergence of this new BPI object into the decentralized network along other various S&OP (Sales and Operations Planning) engines can be used to accomplish methods of fulfillment/manufacturing such as postponed manufacturing. The theory and execution of postponed manufacturing keeps a finished good in semi-finished component form. When an order is selected for final colors, configurations, etc. the unit is assembled, packaged and shipped. The entire nature of the BPI object that can represent finished components available over time and links to their planning bill of material could be a tremendous mass market boost in ability for more firms to not just theorize but execute on postponed manufacturing fulfillment operations. This ability to share the planning bill of material of a target assembly rapidly and easily upstream and down stream in production along with the logistics/fulfillment providers opens opportunity to dramatically improve productivity and profitability for ALL participants in the supply chain network.

Cross company postponed manufacturing would leverage the BPI object and BPI object of components to coordinate a final SKU based on key material located and owned by multiple financial entities in multiple locations. For example, a computer order committed yet the hard drive, the circuit board, the case etc. are all in different company warehouses still owned by those entities. Upon order the BPI object and other key information are used to commit a lead time and start the final assembly for shipment to a customer.

Assembly coordination is a more specialized and detailed use case of the Order Commit application. It would also be a more focused use of the cross company postponed manufacturing. It can be implemented as a service for "builders", "assemblers" of all types from construction, to manufacturing to any type of work requiring more than one item to complete an order or task. A consumer example might be finding all the components required to remodel a kitchen from dozens of suppliers, locations, warehouses or to be built in production (a BPI object array). Assembly coordination would then identify one or more sources of each item but also use the static of dynamic lead times to arrive to complete final project. AC would then push and pull order lead times to make sure no one item of many would constrain the order of the build. So, kitchen cabinets need to arrive before a dishwasher and sink before a water faucet and flooring before cabinets, etc. Again, this is a process every manufacturer/constructor/distributor tries to do today but is limited by the time and project management expertise and experience of the humans involved. The BPI object enabled plans would still depend on human decisions but would allow for the synchronization of broad heterogeneous information form "N" number of suppliers to be organized and presented exponentially more rapidly for decision making. There is much discussion about algorithms, artificial intelligence, machine learning in business processes however all of these require the data to be normalized before effective use. The BPI object is the precursor to organize the "DNA of plans" and when organized, the human planner or business team is much more effective in optimizing outcomes than machine algorithms. It is anticipated that many lower level repetitive tasks, such as cleaning input supply chain execution data, can benefit from the BPI object along with machine learning to further allow for the synchronization of the supply chain network that yields dramatic improvement in supply chain working capital requirements and increases in productivity across said networks.

In another embodiment of the present invention, a computerized method for time-based manufacturing includes: providing a first computer system comprising one or more first processors; generating a first decentralized ledger interchange object using the one or more first processors, wherein the first decentralized ledger interchange object comprises an identifier for an item, a set of time periods, a requested quantity of the item for each time period, and a committed quantity of the item for each time period; generating a first block for the first decentralized ledger interchange object using the one or more first processors; inserting the first block onto the decentralized ledger using the one or more first processors; making the first block visible to one or more second computer systems using the one or more first processors; accessing a second block on decentralized ledger, wherein the second block is created by one or more second processors of the second computer system based on the first block; and using data from the second block to create or modify a manufacturing schedule.

In one aspect, the method further includes: accessing the first decentralized ledger interchange object in the first block of decentralized ledger using the one or more second processors; generating the second decentralized ledger interchange object based on the first decentralized ledger interchange object using the one or more second processors; generating a second block for the second decentralized ledger object using the one or more second processors; inserting the second block onto the decentralized ledger using the one or more second processors; and making the second block visible to the first computer system. In another aspect, the first and second decentralized ledger objects further comprise a price for each time period. In another aspect, the first and second decentralized ledger objects further comprise one or more terms and conditions, one or more specifications for the item, a shipping and handling price, a tax amount, a link to other data or information stored remotely, or a link to other decentralized ledger interchange objects. In another aspect, the method further includes: generating at least one cryptographic key for the second computer system; encrypting the first block using the cryptographic key; and the cryptographic key enables the one or more second processors to view blocks on the distributed ledger and to insert blocks onto the distributed ledger. In another aspect, the method further includes: inputting the identifier for the item, the set of time periods, and the requested quantity of the item for each time period into the first decentralized ledger interchange object using the one or more processors; and inputting the committed quantity of the item for each time period into the second decentralized ledger interchange object using the one or more second processors. In another aspect, the method further includes: generating the first decentralized ledger interchange object using data from a sales and operations planning system; and updating the sales and operations planning system using data from the second decentralized ledger interchange object. In another aspect, the method further includes reconciling and synchronizing the second decentralized ledger object received from multiple second computer systems. In another aspect, the method further includes: automatically exporting data from a sales plan, an inventory plan, a customer lead time plan, a new product development plan, a strategic initiative plan, or a financial plan into the first decentralized ledger object; and automatically inputting data from the second decentralized ledger object into the sales plan, the inventory plan, the customer lead time plan, the new product development plan, the strategic initiative plan, or the financial plan. In another aspect, the method further includes automatically updating an electronic commerce application using the second decentralized ledger object. In another aspect, the method further includes coordinating and synchronizing one or more production arrays of data using the first decentralized ledger object or the second decentralized ledger object. In another aspect, the method further includes rationalizing, synchronizing and coordinating two or more independent decentralized distributed concurrent plans the first decentralized ledger object or the second decentralized ledger object.

One embodiment of the present invention (e.g., the BPI object and network enabled S&OP) provides scalable time based pricing. Very simply, the more time you give a manufacturer to make and produce an item, the better pricing (cost) you should receive. Although hotels and airlines use yield management software, current systems have not been able to provide yield-based production and manufacturing. The BPI object makes this possible. For example, the pricing of physical goods around holidays could vary based on increased demand and the likelihood of delivery problems. In essence, it would be a reservation of a BPI object in a time-phased array that is committed to a buyer. For example, a manufacturer that implements an embodiment of the present invention with S&OP, can offer a stock keeping unit (SKU) available off the shelf in inventory at $10, but the same SKU in component form that might take a week to assemble and ship out is $8.50, and the same item reserved in a master production schedule for build 30 to 60 days out and for delivery 45 to 75 days out would be only $7.50. This is all feasible as the manufacturer can plan lead times of inbound materials and labor much more effectively and in many instances use zero or negative working capital because they have time to synchronize and coordinate manually with their S&OP plans. A low margin SKU is nearly infinitely profitable if the BPI object and network centric S&OP allows the manufacture to collect a customer purchase dollar before deploying capital to produce the product. Thus, material, labor, time-based synchronization linked to shaping of client demand is a new competitive weapon. This is particularly true for manufacturers attempting to out maneuver large retailer/distributors like Amazon who require inventory to be held in warehouses. When you combine several of the concepts above with time based pricing some very interesting business models evolve (all heavily dependent on the BPI object). Combinations of time-based pricing models linked to working capital conservation enabled by BPI object and S&OP with such tactics as postponed manufacturing, postponed manufacturing across various companies, and assembly coordination allow for creative business models that please customers with never before seen choice in physical properties and pricing all while creating a win-win benefit of step function increases in working capital productivity up and down the supply chain network.

In another embodiment of the present invention, a computerized method for time-based pricing includes: providing a second computer system comprising one or more second processors; accessing a first decentralized ledger interchange object in a first block of decentralized ledger using the one or more second processors, wherein the first decentralized ledger interchange object is provided by a first computer system and comprises an identifier for an item, a set of time periods, a requested quantity of the item for each time period, a committed quantity of the item for each time period, and a price for each time period; generating a second decentralized ledger interchange object based on the first decentralized ledger interchange object using the one or more second processors, wherein the price for each time period is not the same for all the time periods; generating a second block for the second decentralized ledger object using the one or more second processors; inserting the second block onto the decentralized ledger using the one or more second processors; and making the second block visible to the first computer system.

In one aspect, the first and second decentralized ledger objects further comprise one or more terms and conditions, one or more specifications for the item, a shipping and handling price, a tax amount, a link to other data or information stored remotely, or a link to other decentralized ledger interchange objects. In another aspect, the method further includes: generating the first decentralized ledger interchange object using the one or more first processors of the first computer system; generating the first block for the first decentralized ledger interchange object using the one or more first processors; inserting the first block onto the decentralized ledger using the one or more first processors; making the first block visible to one or more second computer systems using the one or more first processors; and using data from the second block to create or modify a manufacturing schedule. In another aspect, the method further includes: generating at least one cryptographic key for the second computer system; encrypting the first block using the cryptographic key; and the cryptographic key enables the one or more second processors to view blocks on the distributed ledger and to insert blocks onto the distributed ledger. In another aspect, the method further includes: inputting the identifier for the item, the set of time periods, and the requested quantity of the item for each time period into the first decentralized ledger interchange object using the one or more processors; and inputting the committed quantity of the item for each time period and the price for each time period into the second decentralized ledger interchange object using the one or more second processors. In another aspect, the method further includes: generating the first decentralized ledger interchange object using data from a sales and operations planning system; and updating the sales and operations planning system using data from the second decentralized ledger interchange object. In another aspect, the method further includes reconciling and synchronizing the second decentralized ledger object received from multiple second computer systems. In another aspect, the method further includes: automatically exporting data from a sales plan, an inventory plan, a customer lead time plan, a new product development plan, a strategic initiative plan, or a financial plan into the first decentralized ledger object; and automatically inputting data from the second decentralized ledger object into the sales plan, the inventory plan, the customer lead time plan, the new product development plan, the strategic initiative plan, or the financial plan. In another aspect, the method further includes automatically updating an electronic commerce application using the second decentralized ledger object. In another aspect, the method further includes organizing a production capacity in pricing blocks using the second decentralized ledger object. In another aspect, the production capacity is within a production facility, a production line within the production facility, a product production across multiple facilities, multiple geographic areas or an entire company.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures and in which:

FIGS. 7A-7B are graphic views of a generic BPI object moving in a block in accordance with one embodiment of the present invention;

FIG. 12 is an illustration of how the BPI object enables decentralized distributed S&OP in accordance with one embodiment of the present invention;

FIGS. 14 and 15 illustrate an example of a service in accordance with one embodiment of the present invention;

FIGS. 20-28 illustrate a BPI object enabled production capacity and commitment conversation between financial entities in accordance with one embodiment of the present invention;

FIG. 31 illustrates how the BPI object manages decentralized virtual inventory in accordance with one embodiment of the present invention;

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
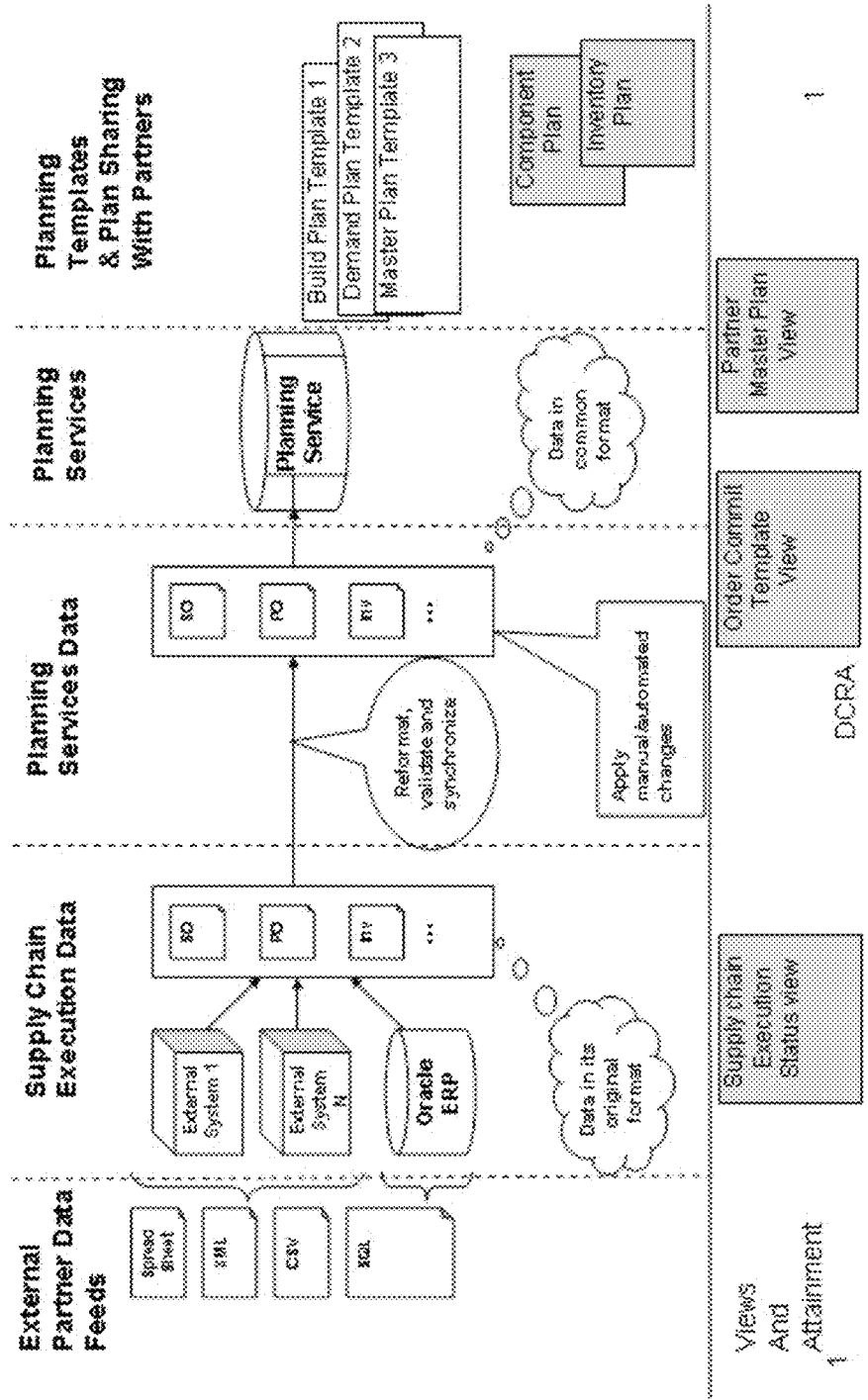
FIG. 1 is a block diagram of a S&OP solution roadmap in accordance with one embodiment of the present invention.

Various embodiments of the present invention provide a decentralized Sales and Operations Planning ("S&OP") system with a distributed ledger, such as Blockchain, Etherium, Hyperledger, Quorum, etc. The entire distributed ledger becomes the core "database" of decentralized data and distributed Apps ("DAAPs") enable "smart contracts" (essentially stored procedures) that click off based on the self-describing distributed ledger network. A block diagram of a S&OP solution roadmap 100 in accordance with one embodiment of the present invention is shown in FIG. 1. BPI (blockchain planning interchange) object, also referred to as decentralized ledger interchange objects, flow directly into and out of the planning service repository using the planning templates to partners in a synchronized manner.

Figures 2, 2A:
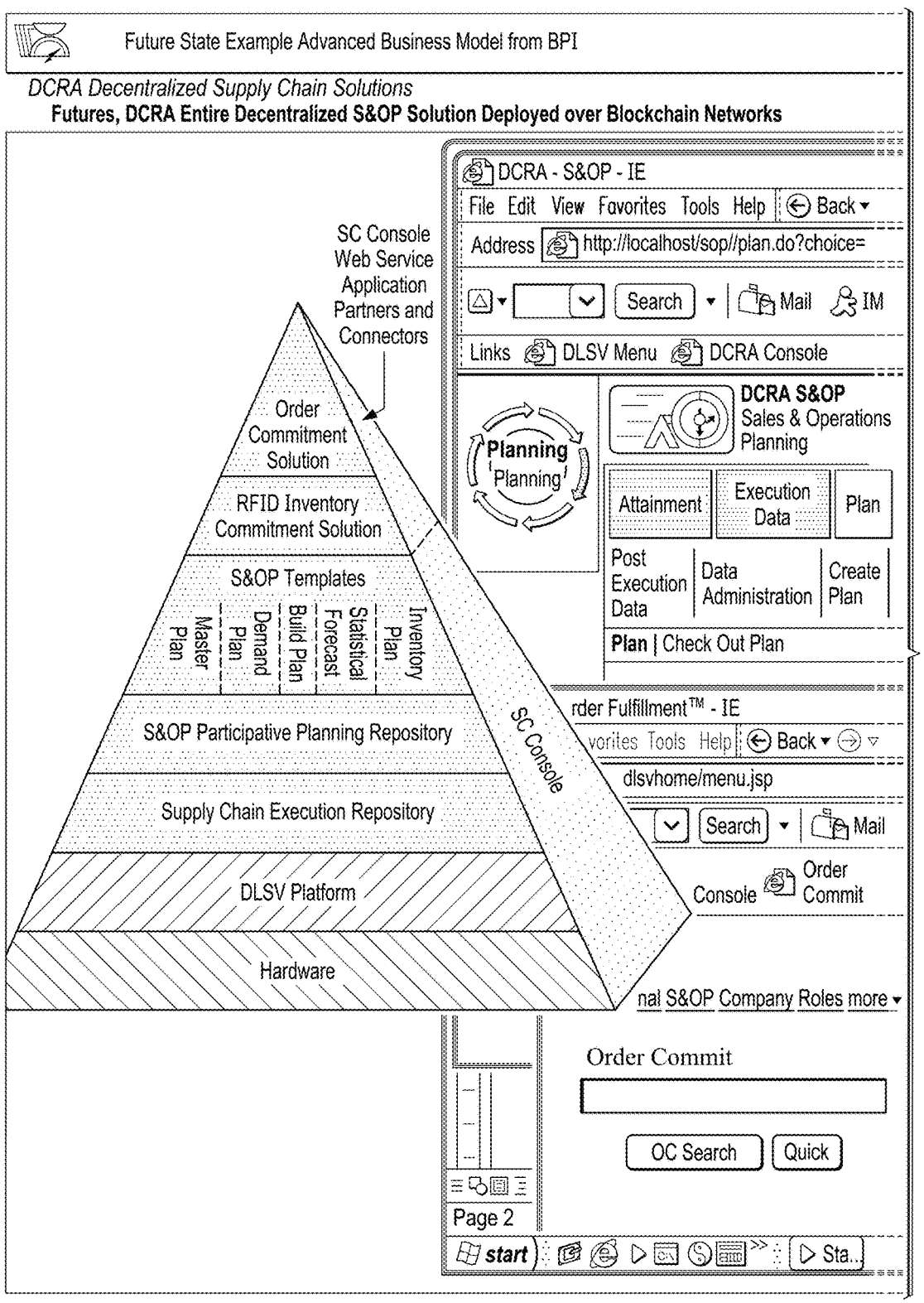
FIG. 2 is a representation of the types of user interfaces (solutions) fed by the BPI object in accordance with one embodiment of the present invention.
Figure 2B:
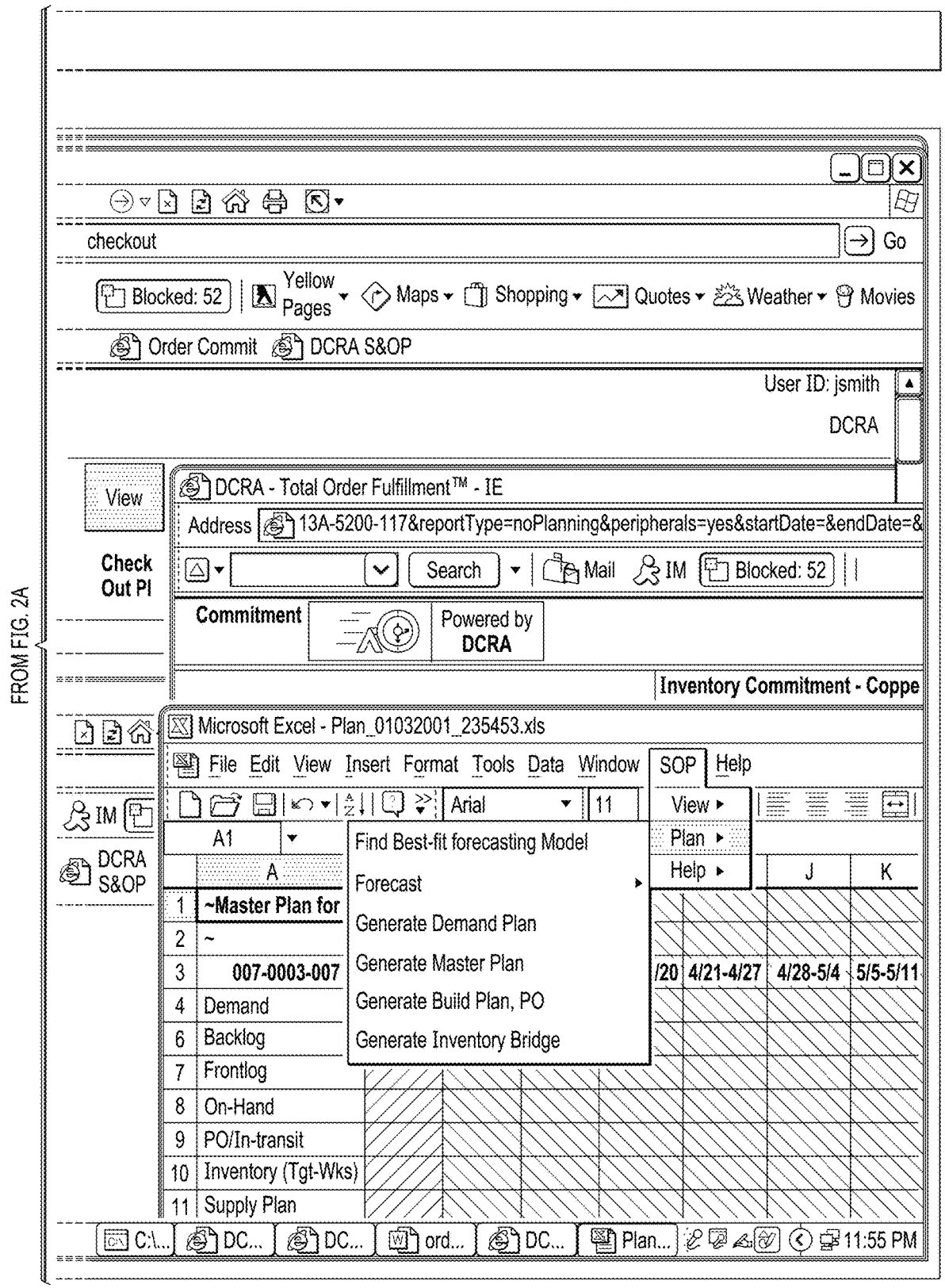

A representation of the types of user interfaces (solutions) fed by the BPI object is shown in FIG. 2. The BPI objects are fed to centralized S&OP plans, order commitment SOE execution requests, as well as rollups of the BPI feeds from many suppliers, into the ability to commit an order and lead time for clients within and between blockchain networks. These advanced blockchain DAAPs could push and pull S&OP plans at the edge of the network back to a centralized rollup. Non-limited examples of S&OP systems that will work with the present invention are described in U.S. Pat. Nos. 5,974,395, 7,657,534 and U.S. Patent Application Publication No. 2010/0262581, which are hereby incorporated by reference in their entirety.

Embodiments of the present invention can be implemented using any existing or future distributed ledger system in which digital data is replicated, shared and synchronized across nodes within a peer-to-peer network. Each node replicates and saves an identical copy of the ledger and updates itself independently. There is no central administrator or centralized data storage for the distributed ledger. The systems can be either public or private. Blockchain is an example of distributed ledger that is resistant to modification of the data, in part, because it is a growing list of blocks that are linked together using cryptography. Typically, each block contains a cryptographic hash of the previous block, a timestamp and transaction data. The invention is by no means limited to what current IT professionals describe as Blockchain but rather possible on ANY decentralized/distributed network protocol.

Blockchain represents a method to scale a loosely coupled decentralized network of data but keep it in sync or better yet decompose the plan send out for comment and recompose, resync. This is done with blockchain nodes, shared ledgers, peer to peer IP messaging and encryption technology. It allows for decomposition for security reasons as well as business process reasons.

Various embodiments of the present invention use a distributed ledger planning interchange object as the basic building block element of a supply chain plan (time phased array of data) encapsulated in distributed ledger technology and designed to be disassembled and reassembled into any planning tool from a spreadsheet (e.g., Exel, etc.) to the most complicated planning tool. As used herein, the distributed ledger planning interchange object will be referred to as a blockchain planning interchange ("BPI") object, but it is not limited to blockchain. The BPI object works on all major blockchain technologies (ethereum, hyperledger and quorum) and in a permissioned (private network) or in a public (non permissioned) blockchain decentralized network. The BPI blockchain object is completely transferable between private and public decentralized networks regardless of their "topology", "brand", or instantiation/implementation Some examples of decentralized S&OP with DAPP and Smart contract rules enforcement will now be briefly described.

Figure 3:
FIG. 3 illustrates two physical examples in which postponed manufacturing is enabled by BPI object and blockchain in accordance with one embodiment of the present invention.

FIG. 3 illustrates two physical examples, namely a vehicle and a cell phone, in which postponed manufacturing is enabled by BPI object and blockchain in accordance with one embodiment of the present invention. Three of many possible new business models are enabled by the BPI's ability to synchronize the supply chain network as well as many S&OP plans. For example, keeping components of a vehicle in ready-to-assemble form and the same for a hi-tech cell phone products. The ability for the BPI object and the conversational BPI objects to make communicating quantities, lead times of these assemblies as effortless as communication about a SKU (stock keep unit) is revolutionary in the creation of supply chain efficiency as discussed. These examples include postponed manufacturing enabled by BPI object and blockchain where a planning bill of materials is linked via the BPI object to the original source, S&OP is enabled against decentralized data, final assembly close to demand, massive working capital savings, and intellectual property protection. If a manufacturer is given more lead time to coordinate and plan his production his cost of raw materials, his scheduling of labor and even his overhead costs of facilities and equipment go down. For confirmation of how beneficial this capability can be and how the intellectual capital has not yet been previously discovered is there is virtually NO example of lower price for longer lead times in the consumer market and if done in the commercial industrial market is done through negotiation not a general business model. Advanced DAPPs and smart contracts that enable much more rapid synchronizing the conversation of how much to make when using the BPI object and decentralized S&OP plans not only enable but make these advance business models like automatic assembly logic for postponed (delayed manufacturing), and assembly coordination the norm in the consumer and industrial manufacturing ecosystems. Thus allowing synching of numerous items in an indented planning bill of material to be coordinated to a location at the same time from many suppliers and supply points/thus blocks in the blockchain.

Figure 4:
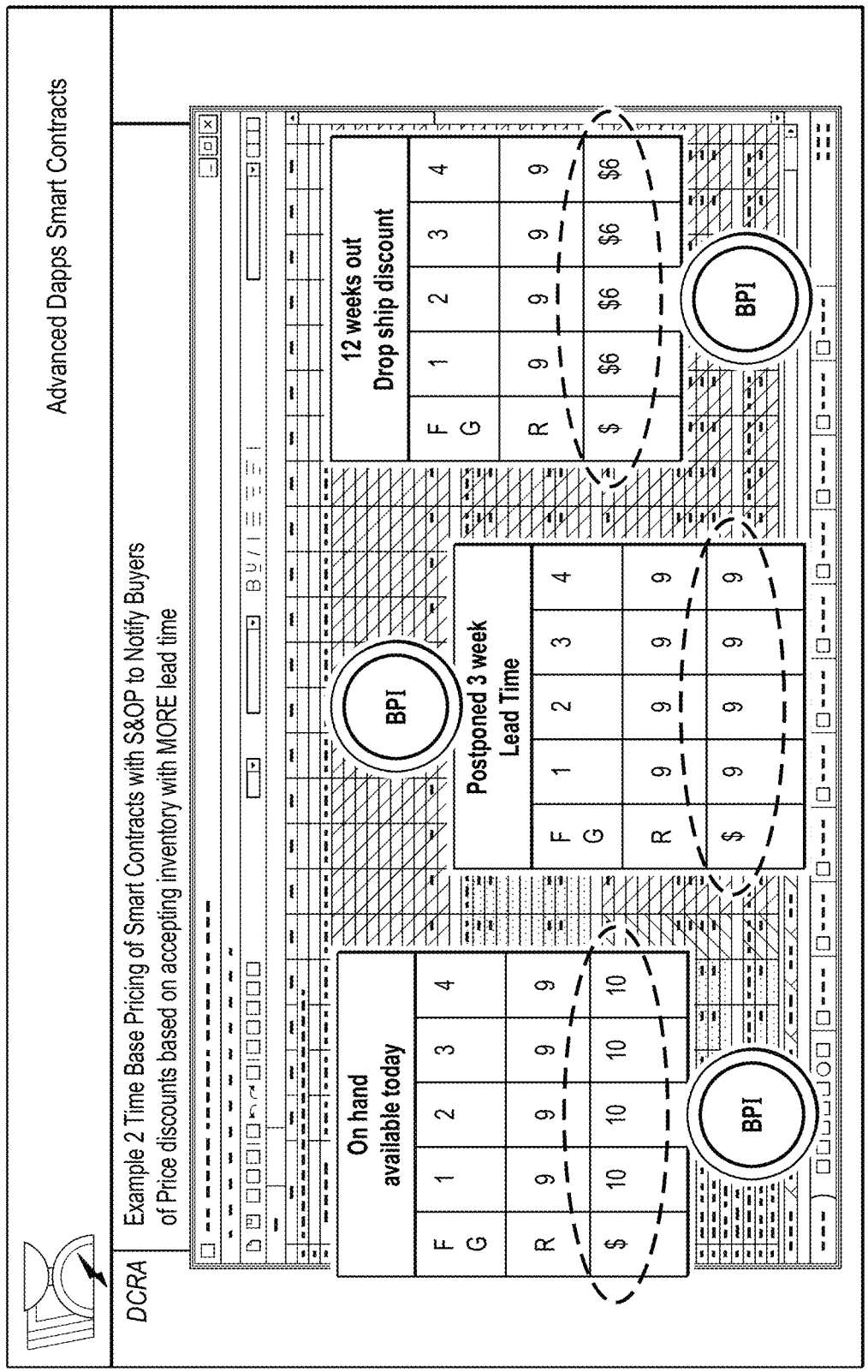
FIG. 4 illustrates how the BPI object, along with a decentralized S&OP network, enables "Smart Contracts" and/or distributed applications that allow for these build assemblies along with lead times to be persisted and maintained throughout the network in accordance with one embodiment of the present invention.

FIG. 4 illustrates how the BPI object, along with a decentralized S&OP network, enable "Smart Contracts" and/or distributed applications that allow for these build assemblies along with lead times to be persisted and maintained throughout the network. Time based pricing of smart contracts with S&OP is used to notify buyers of price discounts based on accepting inventory with more lead time. If the build inventory schedules/plans can be shared and committed to through a decentralized network, then much of the overall working capital/inventory could be reduced thus allowing manufacturers to incept customers to take a lower price for longer lead times. Advanced DAPPs and smart contracts provide the ability for manufacturers and distributors to use time based pricing. Coordinating production commitments provides based on time provides discounts to same SKU if given more time to produce it. Furthermore the concept gets ever more interesting when combining lead times with the planning build of material (basic components for assembly) where lead times are pushed back to coordinate at time all are available. This enables massive time reduction for the jobs rolls who coordinate material across our economies from Boeing making airplanes to the general contractor remodeling your kitchen. As shown, the price is $10 for units that are on hand and available today, the price is $9 for units that are postponed with a three week lead time, and the price is $6 for units for drop shipment twelve weeks out. Note that the prices can vary during the different periods. This is analogous to yield management in airlines and hotels but done a decentralized database of request and respond networks. Although concept of yield management is not new applying in todays highly decentralized manufacturing supply chain requires the BPI object and advanced BPI object based S&OP.

Various embodiments of the present invention provide a DAPP (distributed app) that sits inside any blockchain network that can do a complete S&OP plan. This allows for levels of autonomy linked to the broader network to synchronize demand and supply within the network.

Figure 5:
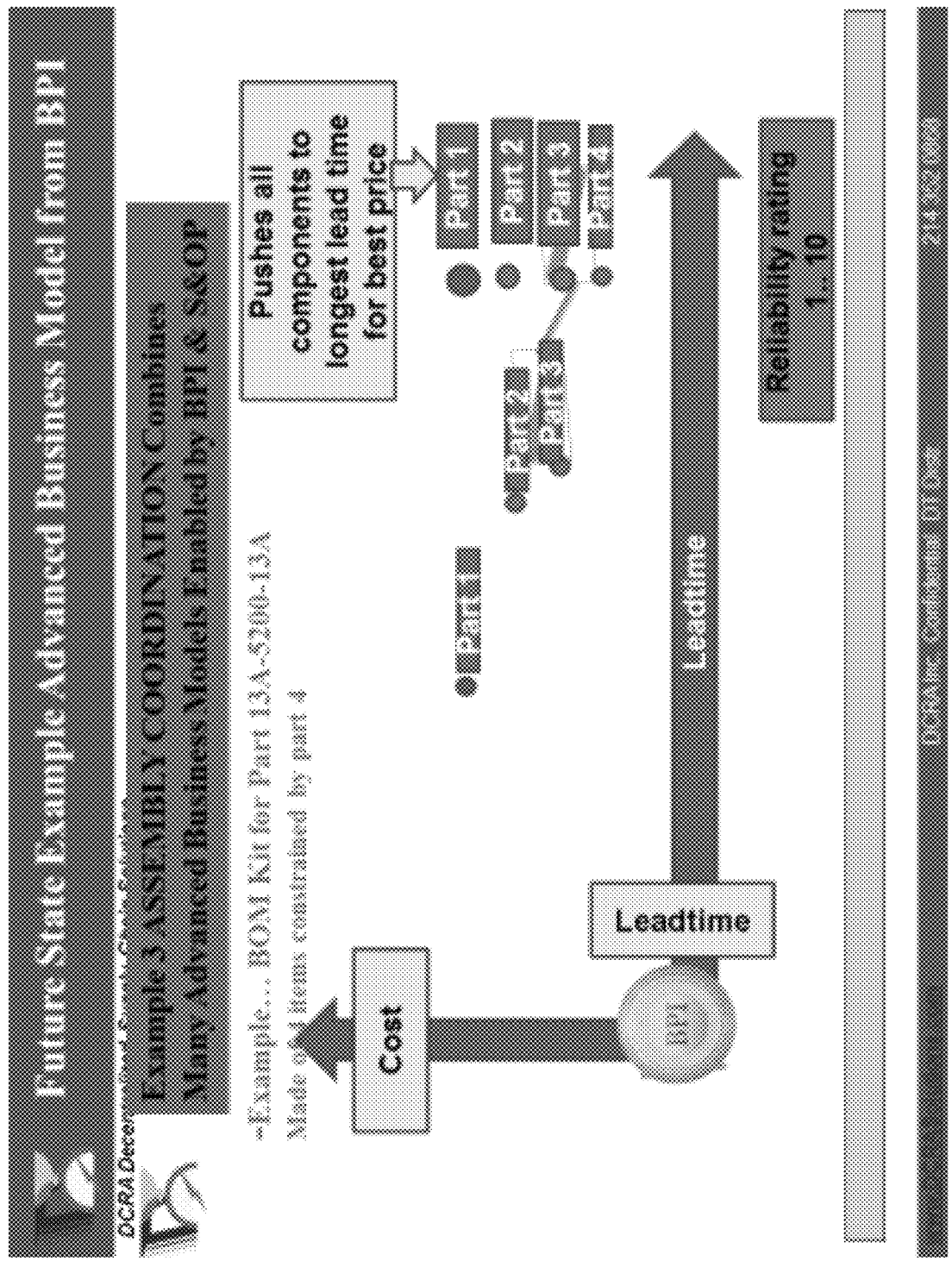
FIG. 5 illustrates an example in which assembly coordination combines many advanced business models enabled by BPI object and S&OP in accordance with one embodiment of the present invention.

FIG. 5 illustrates an example in which assembly coordination combines many advanced business models enabled by BPI object and S&OP (aggregated business models). As shown, a bill of materials for Part 13A-5200-13A is made up of four items. The parts are displayed based on cost and lead time, in which Part 1 has the highest price and shortest lead time, Part 2 has a lower price and a longer lead time, Part 3 has a lower price and a longer lead time, and Part 4 has the lowest price and the longest lead time. Since Part 4 has the longest lead time, delivery of the other parts can be pushed out to the longest lead time (Part 4) and discounted prices for Parts 1, 2 and 3 can be obtained. This is a process material planners in all industries do daily hourly but with the BPI object their ability to use computing to dramatically save time in their existing process and expand their network of partners dramatically is exponentially improved.

The BPI object will now be described in more detail. Think of the BPI object as a blockchain instantiation of an array of numbers over time periods (like a spreadsheet) or in computing architecture an "array" is a common term for a list of numbers in a period sequence. The BPI object is this array can be defined down to one line item (one SKU) for a few periods or can be a large portion of an entire schedule with multiple SKU's depending on the application. From a lay perspective, the BPI object is the "DNA" or genetic Lego building block of all schedules and plans. BPI objects are signals or messages sent to decentralized/distributed versions of one or more planning systems.

The BPI object is highly differentiated from existing data standards or other data structures to share production data across differentiated systems using either online share databases or with flat files.

The BPI object can be formatted as EDI, XML, REST messages or any other type of known or unknown message.

The BPI object can be decentralized distributed but then reconnected, and it will know where it fits in the aggregation of multiple streams of arrays of production over time from multiple sources. This is accomplished using time-stamps indicating the network or owner it came from (e.g., node owner identifier, blockchain identifier, etc.) and the date it was created.

The BPI object is encrypted with network centric encryption so the owner of the BPI object can choose who in the network can read the data and or modify the data.

The BPI object is created as part of a decentralized network. So it can be a single item of a few weeks of production information or could represent an entire S&OP planning result to be shared with other entities for use or consolidation.

The BPI object because the inherent data of when, where, why, who it came from as well as time stamping greatly assists the human or computer assisted human in reconciling time netting of consumption of previous demand from previous production. This ability is much like the ability of insect colonies of ants or bees to work collectively using offline instructions/pheromones visual signals (still a mystery to science). The result is dramatic synchronization of activity. This is one of the goals of the BPI object—become the base element to the production planning, S&OP, supply chain planning, forecasting systems so they all can work concurrently but with dramatically improved synchronization.

The BPI object builds off of historical standards like an ANSI EDI 830 message but is usable by any system standalone to the most sophisticated encrypted decentralized network.

The BPI object is not restricted to one estanutaton of the data. The BPI object can be a specific single item of production and commitment over time or a complete plan results with all items, consumption, forecasts, production and commitment result. Like the build plan output of an S&OP system. As noted herein, the importance of the BPI object can be best understood by the advanced business models and ability to run S&OP as a decentralized distributed process across heterogeneous company and technology networks/environments.

In one embodiment, the BPI object is a portion of a master production plan (in a spreadsheet or in a database controlled planning system) that an entity wishes to communicate and receive a commitment on. The BPI object can be a portion of data in an array, or a portion of a multiparty spreadsheet that can be disseminated, acted on and then communicated back to the original owner with the appropriate time stamps, version stamps, permissions, hierarchy of importance, etc. An off chain application can reassemble the BPI object back to its original form, but with the feedback and knowledge of the loosely coupled distributed/decentralized participants. The BPI object enables a "Hivechain" or "Intelligence at the edges" computing framework that encourages validation closest to the operation and resynchronization without human interaction. This system takes the burden of data coordination largely away from the human and allows the human planner/decision maker to act, run scenarios, provide time to consider alternative approaches that better accomplish a goal. That goal could be as wide ranging as speed at any cost to minimum cost with unlimited time.

Figure 6:
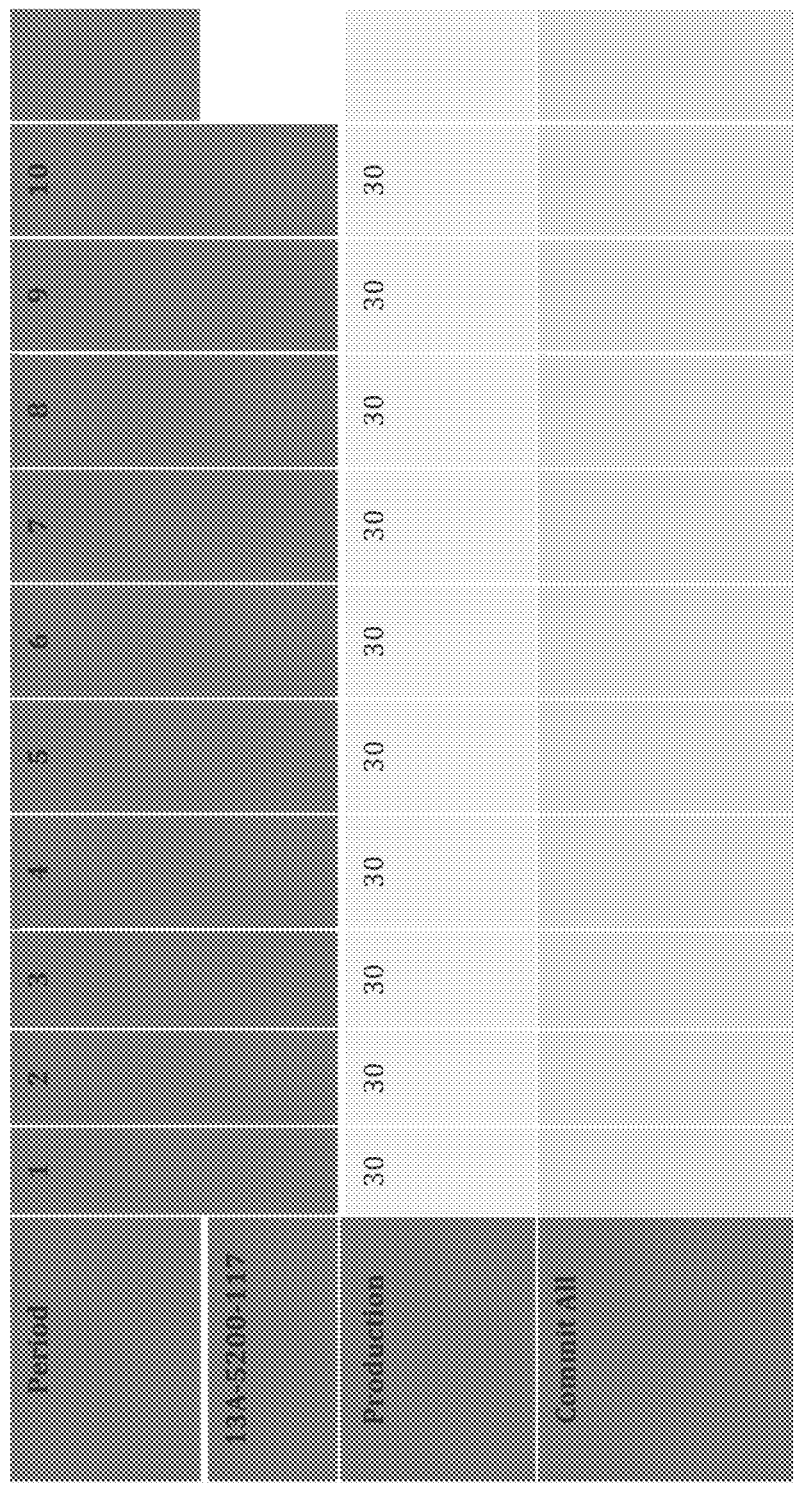
FIG. 6 illustrates an example of a BPI object configuration having an array of periods for an item with requested production and an array for commitment in accordance with one embodiment of the present invention.

FIG. 6 illustrates an example of a BPI object configuration having an array of periods for an item with requested production and an array for commitment. The BPI object is co-coordinating lead times of individual arrays of production with the planning bill of material describing part dependencies components required to complete a finished item. The simple example is pushing all parts back to the lead time of Part 4 to coordinate assembly but do at a lower cost as without Part 4 the finished item cannot be built, shipped etc. More specifically, the array of periods includes one or more time periods (e.g., ten periods 1 to 10) for part number 13A-5200-117. As shown, a requested production of 30 units for each of the time periods is shown. Note that the quantities can vary for the different time periods. The supplier will add the quantities that they can provide in the commit section. Price information and other terms may also be added to the BPI object. The BPI object is the transaction data that is recorded into the block of the blockchain. This illustration of the BPI object is for one item over 10 periods but the BPI object is not limited to a single configuration. The design of the BPI object allows for the definition of number of items and periods to be understood between trading partners and synchronized back into or with production/S&OP plans at will. This also provides flexibility to accommodate preferred practice for various reasons (tradition, industry, production planning system integration feeds, etc.). Note that the BPI object is not limited to this data configuration.

If BPI objects and other similar objects are widely used for open purchase orders, available inventory, in-transit inventory, open orders, etc., they become instantiated in blocks in the production planning network and will create a time synchronized record of key execution data and planning data for all nodes in the block (companies, planning locations, etc.). Thus, by using the blockchain data sharing ecosystem, this time synchronized and scrubbed warehouse of data becomes available for a node. Furthermore, may become available across nodes thus that a larger powerful brand owner my run a plan to suggest purchases a supplier does to support the brand owners needs. For example, Apple looks at component supplier Corning's ability to push inventory to Foxcon and advises on production suggestions even though they are not financial responsible for Corning or Foxcon production assets and people. In most cases owners of the asset would reject this "advice" but potentially in a situation such as Apple it is welcome as Apple might be owning nearly 100% of said facility or entire production capability of Corning or Foxcon for a period of time and willing to pay for it. Much like renting a car you know own for a period of time and up to you to make the best utilization of the asset for that period of time?

In one embodiment, the BPI object is a generic time-based array in Java Script, spreadsheet scripting language or any other tool to store on a distributed ledger data. The data can be stored in a block in a node on the supply chain or can be stored in a larger centralized data pool (e.g. Interplanatory File System ("IFPS") link to a database). The BPI object is kept generic so it can be used in all major forms of blockchain platforms (Ethereum, Hyperledger, Quruom etc.) and also used in non-blockchain decentralized network data stores and topologies. In fact, the BPI object can be deployed across numerous formal/informal networks for databases, spreadsheets, email, XML and other communication methods. Any database or flat file of choice can be used. Using the shared ledger, consensus models of blockchain the BPI object can be broken out of any existing schedule or plan and sent via blockchain peer-to-peer and encrypted decentralized network to any and all nodes.

Figure 7B:
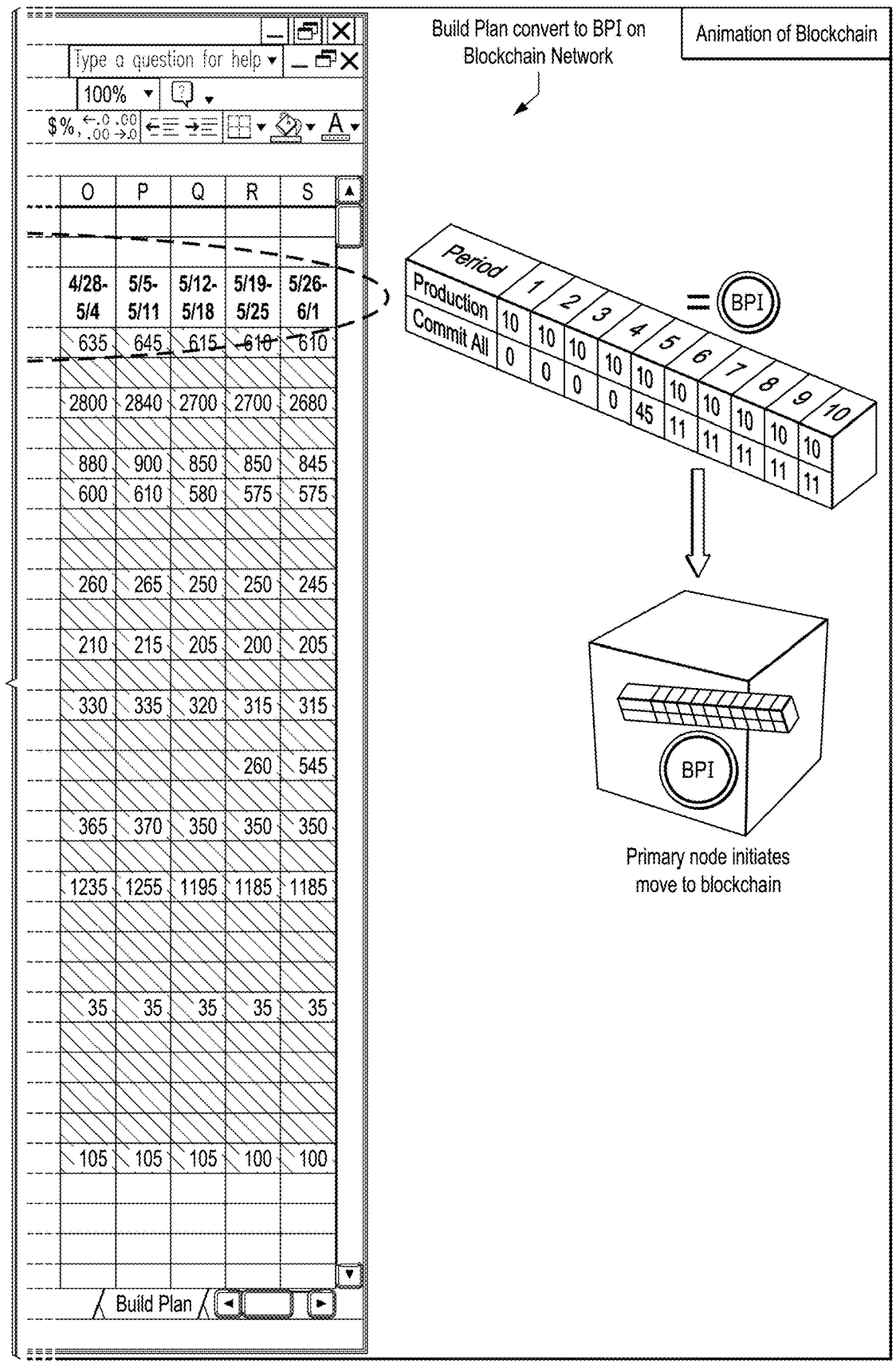
Figure 8:
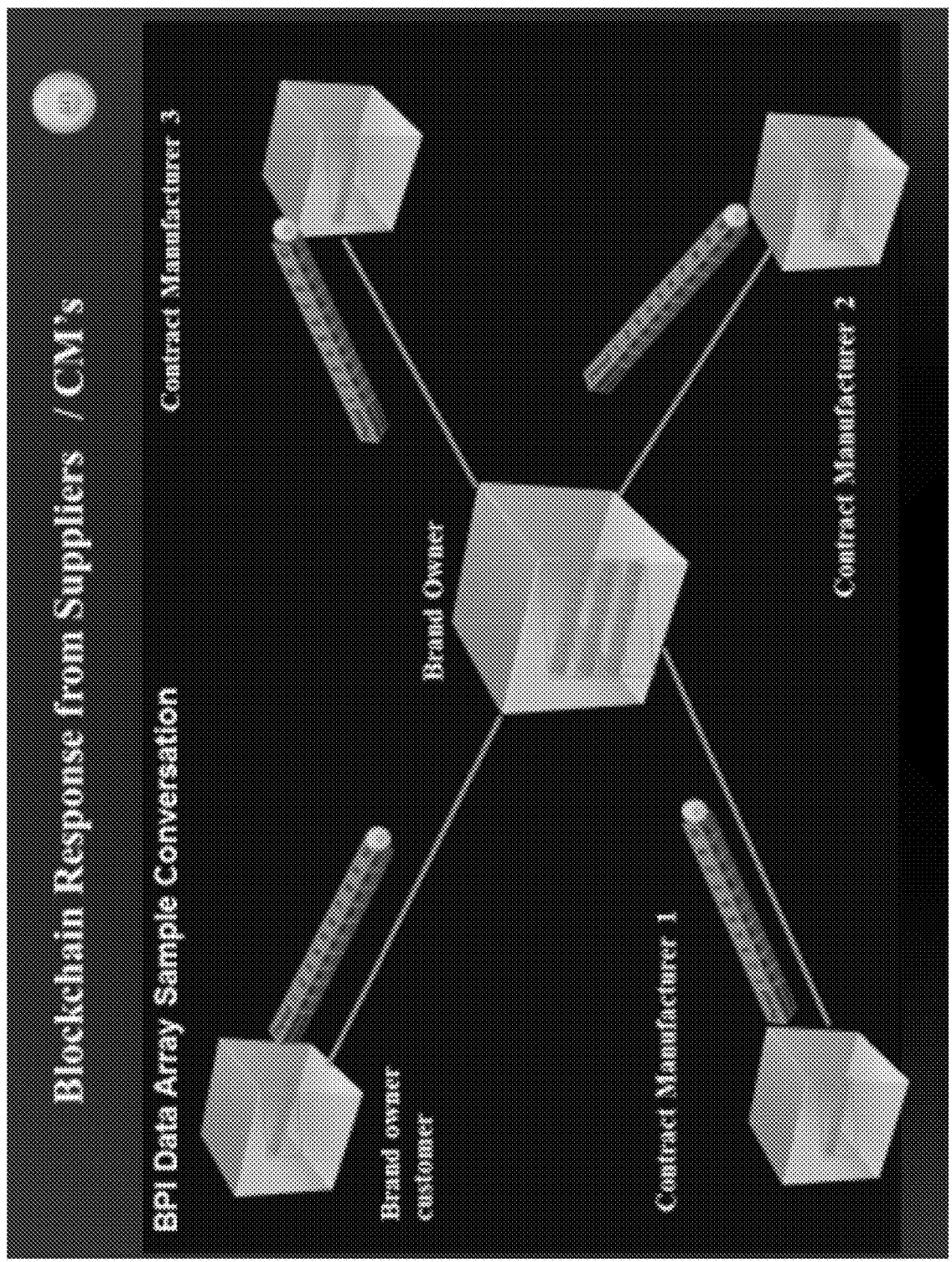
FIG. 8 is a graphic view of blocks synchronizing and replicating BPI objects through nodes on decentralized network in accordance with one embodiment of the present invention.
Figure 9:
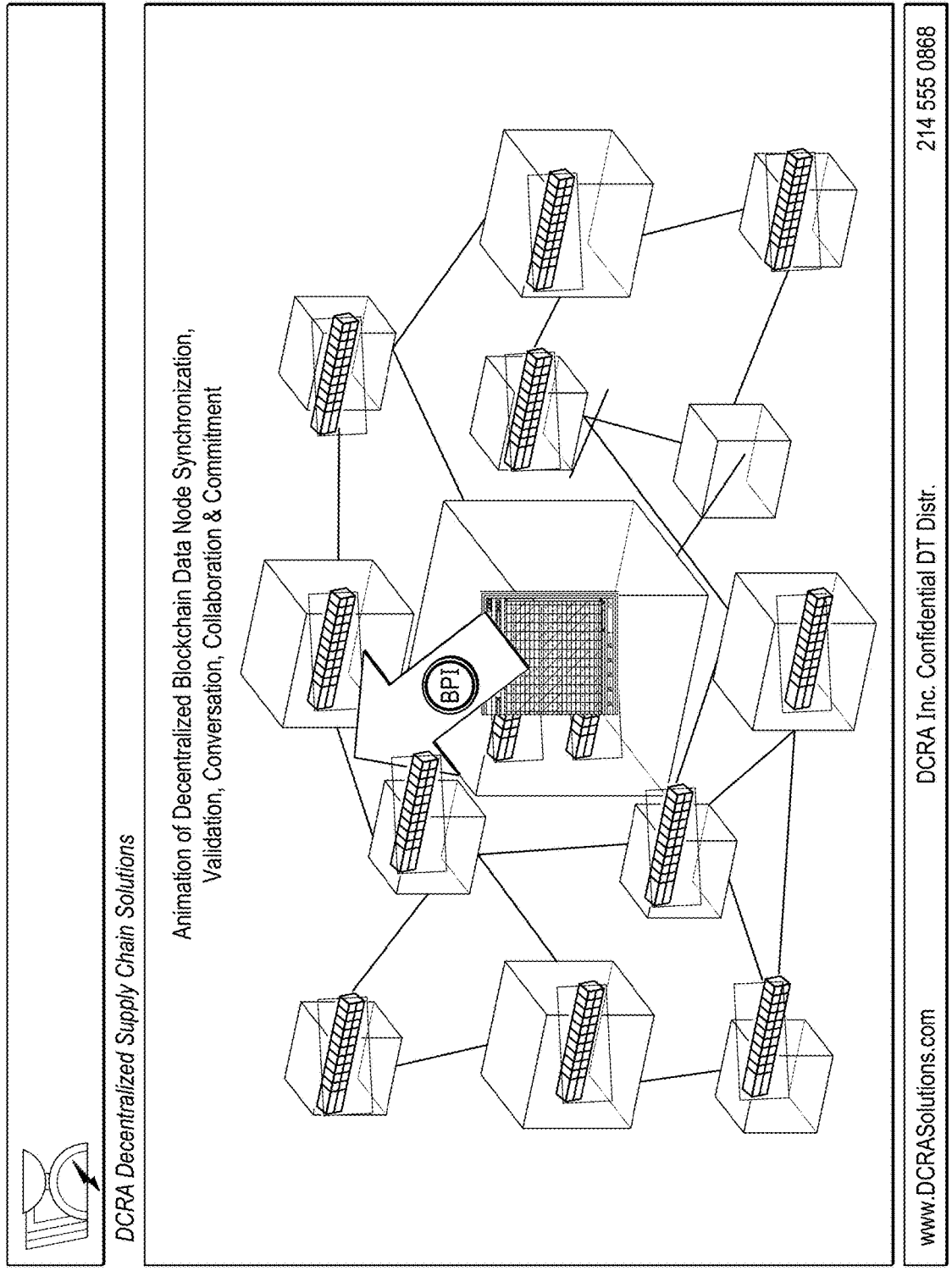
FIG. 9 is an illustration of decentralized blockchain data node synchronization, validation, conversation, collaboration and commitment in accordance with one embodiment of the present invention.
Figure 10:
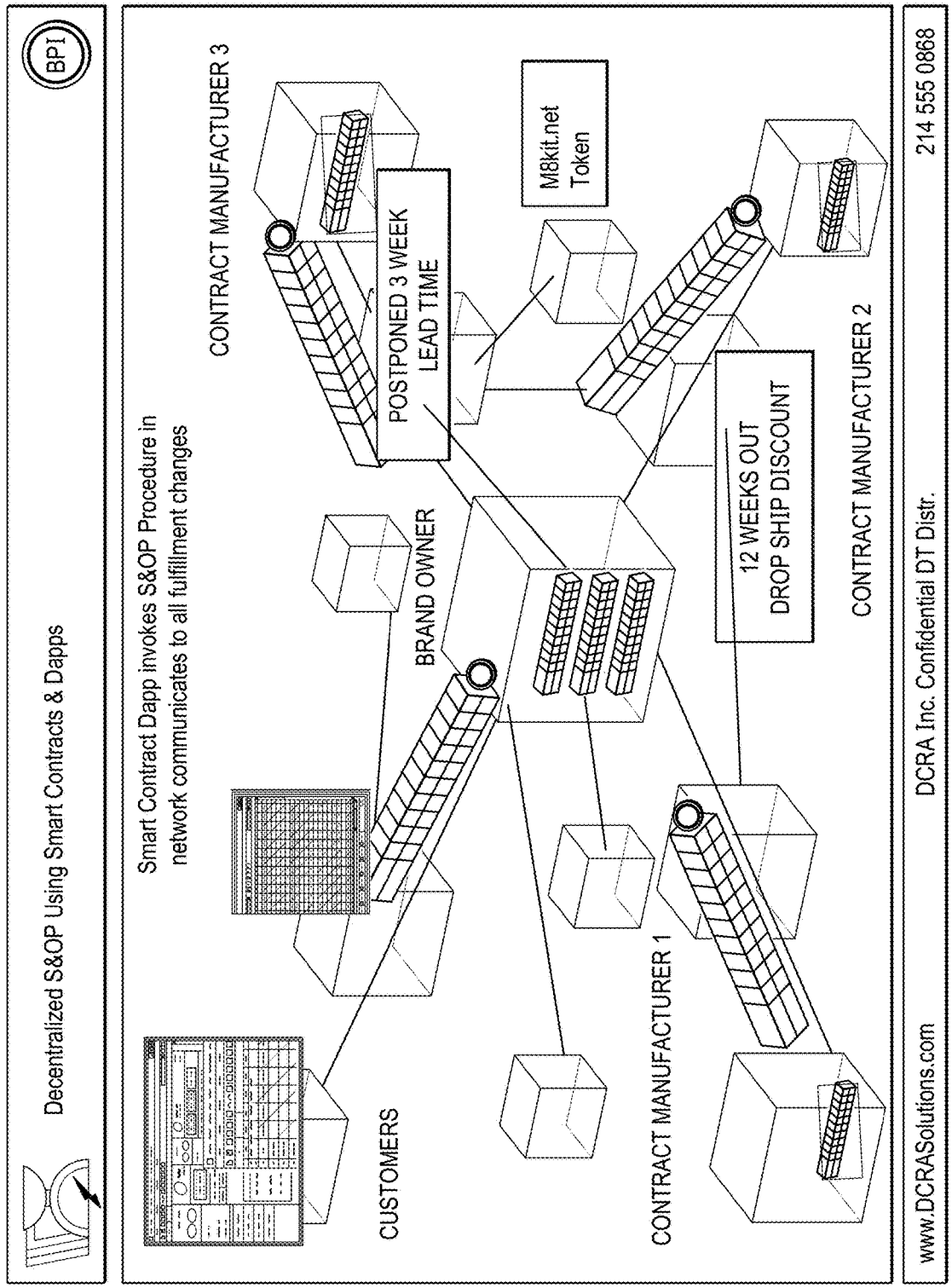
FIG. 10 is an illustration of decentralized BPI objects disseminated across a supply chain network, which enables new powerful business models that greatly improves activity synchronization in accordance with one embodiment of the present invention.
Figure 11:
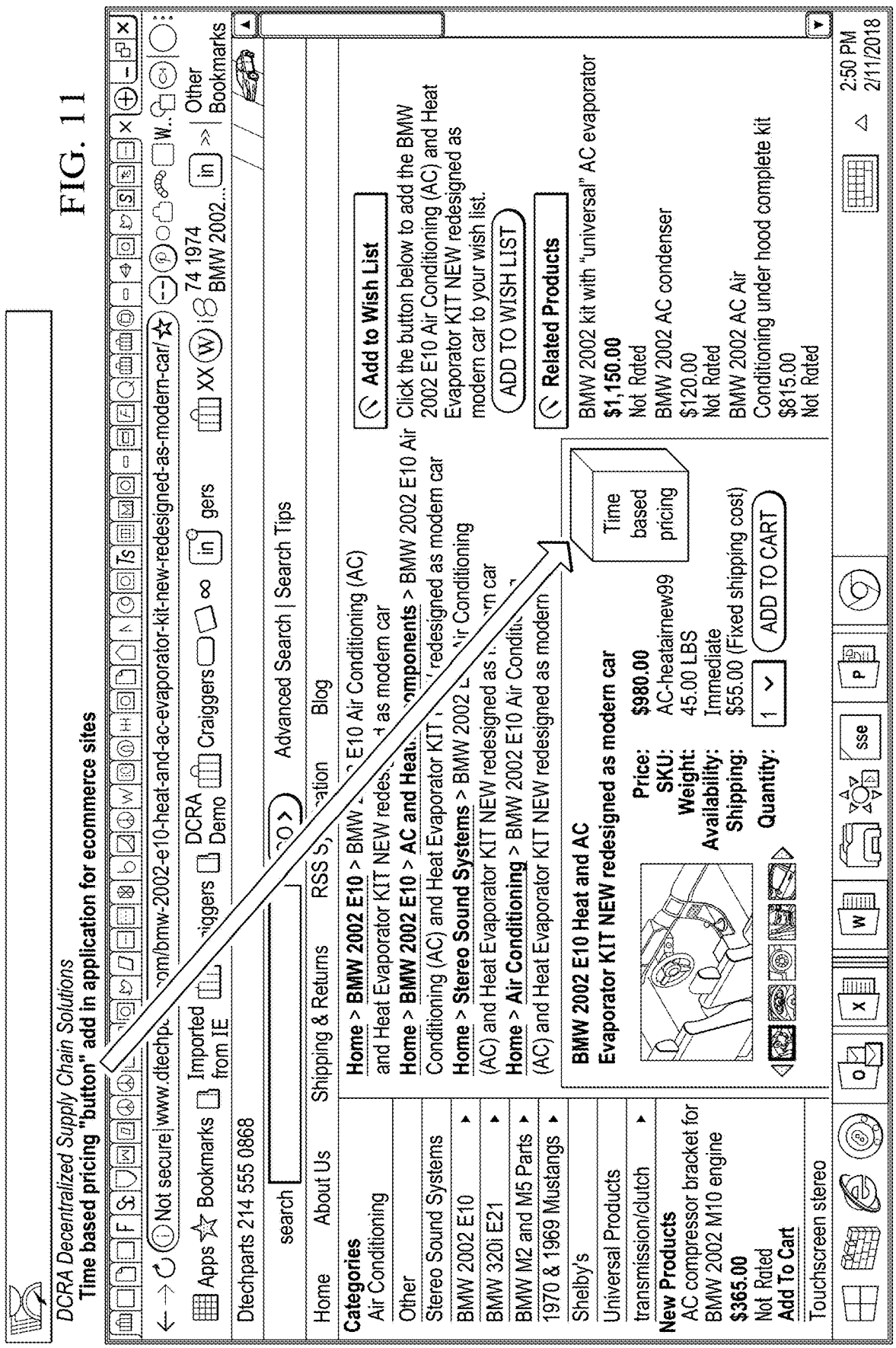
FIG. 11 is an illustration of deploying BPI object enabled business models in any order entry system in accordance with one embodiment of the present invention.

A graphic view of a generic BPI object moving in a block is shown in FIGS. 7A-7B. A graphic view of blocks synchronizing and replicating BPI objects through nodes on decentralized network in shown in FIG. 8. An illustration of decentralized blockchain data node synchronization, validation, conversation, collaboration and commitment is shown in FIG. 9. An illustration of decentralized BPI objects disseminated across a supply chain network, which enables new powerful business models that greatly improves activity synchronization is shown in FIG. 10. An illustration of deploying BPI object enabled business models in any order entry system is shown in FIG. 11. An illustration of how the BPI object enables decentralized distributed S&OP is shown in FIG. 12

Figure 13:
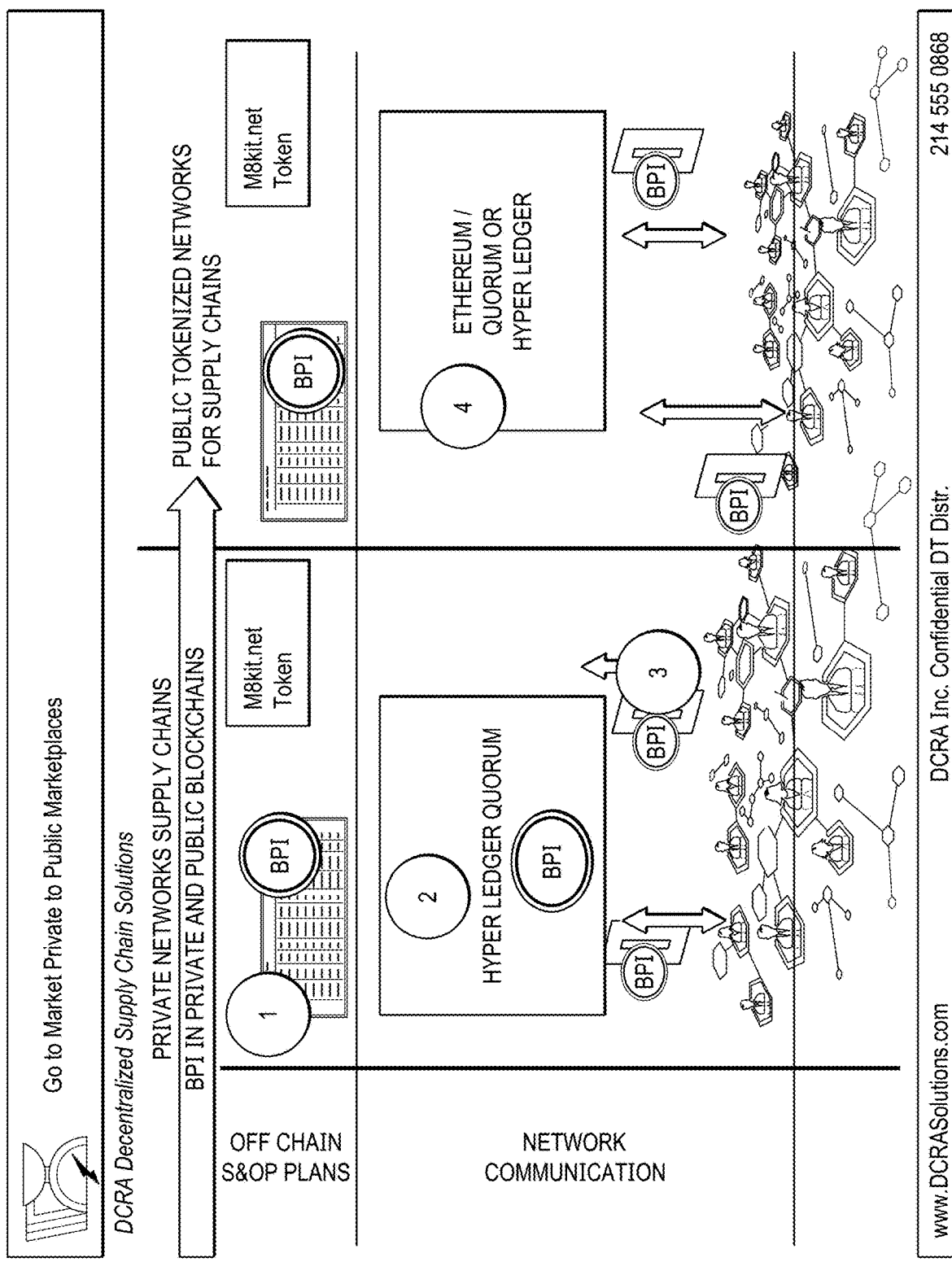
FIG. 13 illustrates examples of a private networks supply chain and a public tokenized network for supply chains in accordance with one embodiment of the present invention.

In one scenario, the BPI objects work on a private (permissioned) blockchain where all the trading partners in the network already know and trust each other. In this case, there is no need for Proof of Stake or Proof of Work algorithms to determine trust. In another scenario, the BPI objects work as same array defined object in the public or non-permissioned blockchain. This is where various proof of trust algorithms are used and require $3^{rd}$ party miners to define trust. Much like cryptocurrency mining works but more specific to the data element. In both scenarios, the level of complexity is much lighter then in a transactional level data sharing, such as financial services that are prolific in the blockchain world today. So much of the BPI object can be accomplished and has been accomplished without blockchain technology. These scenarios are illustrated in FIG. 13.

What blockchain platforms offer is the latest approach to scale, to proliferate to provide popularity of the approach thus making the decentralized network a close to real time as necessary but allowing participants to control level of data they share, how often, in what form and to respond to requests at a rate commensurate with their internal planning and profit goals as well as other mitigating business process goals. Thus, a firm participating in aerospace machining will take much more time to respond but maybe more precise. A contract manufacturer producing apparel or low cost electronics may be near real time due to competitive pressures and the required agility of the network.

Figure 14:
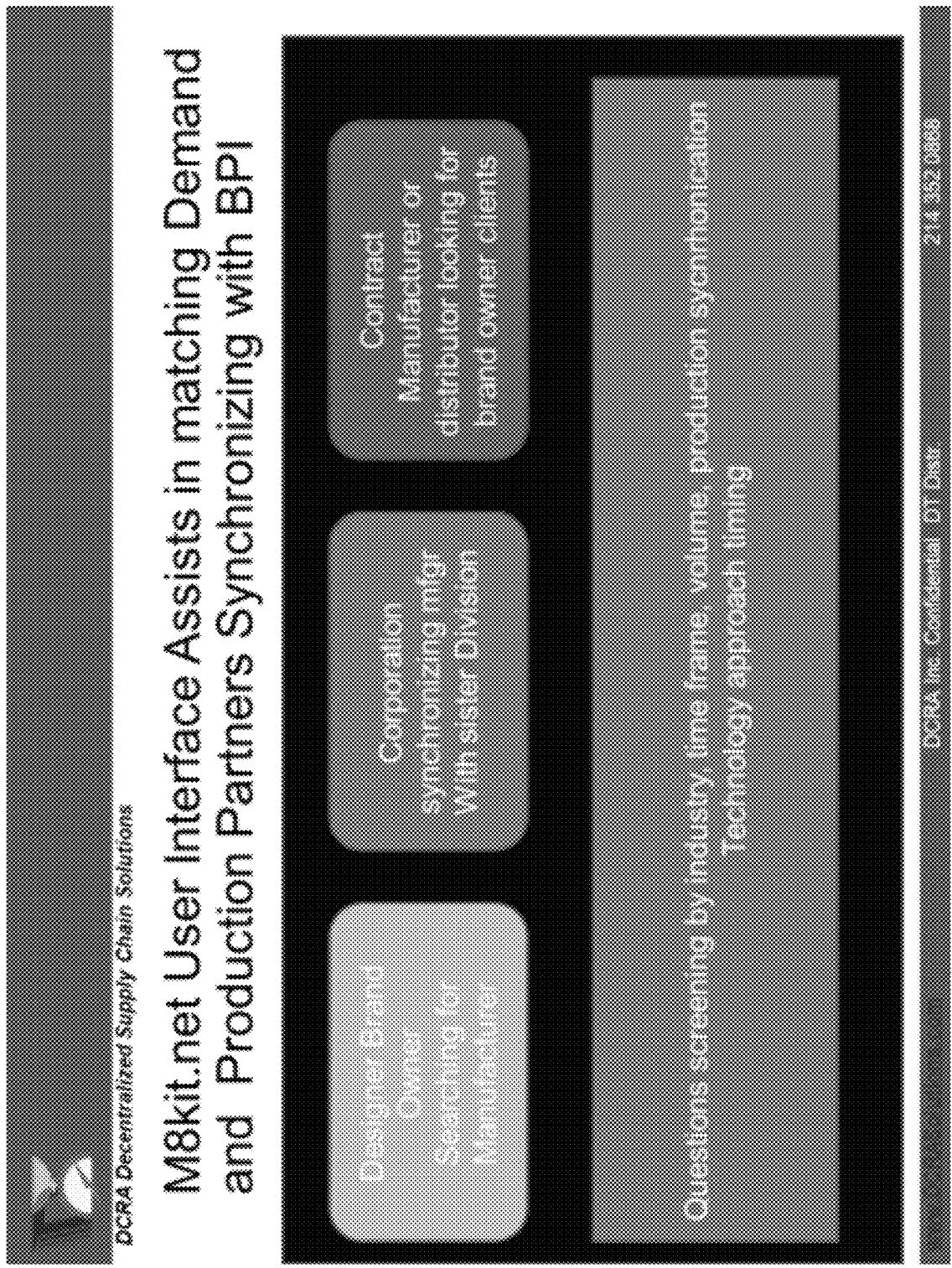
Figure 15:
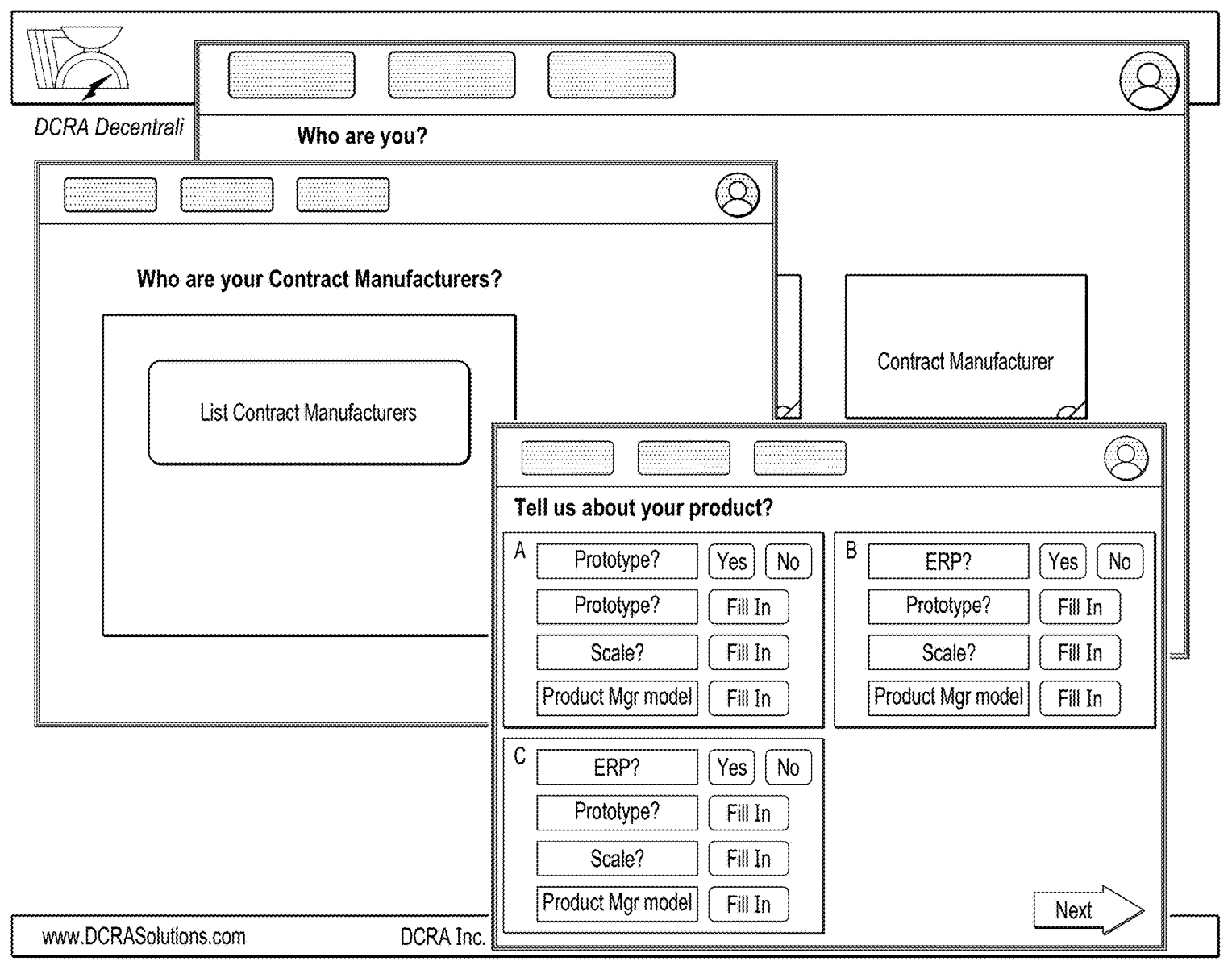

"M8keit" is a service to provide a synchronized production BPI object data coordination supply chain between brand owners and manufacturers and their tiers of suppliers using asynchronous/loosely coupled blockchain technology and the BPI. The BPI object design will feed S&OP and all variations of forecasts, plans and schedules using a service at the URL M8kit.net. As shown in FIGS. 14 and 15, M8kit starts with matching potential brand owners, manufacturers and suppliers but is real unique and large value add is in coordinating these time based plans in a synchronized fashion to catalyst successful long term relationships and relationships that serve customer desires at a much lower price point through build to order time based pricing incentives.

Figure 18:
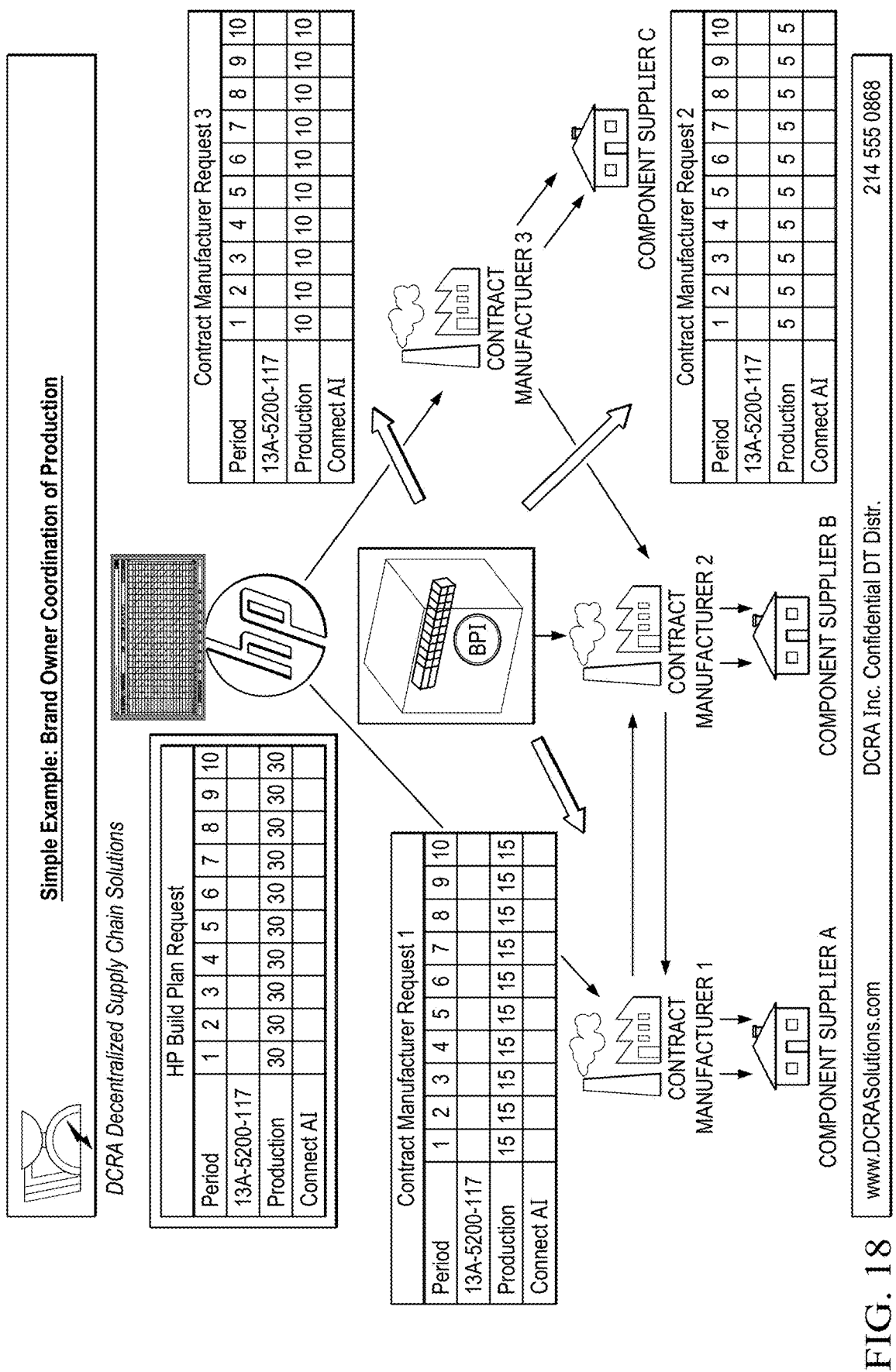
FIG. 18 illustrates a typical use case in accordance with one embodiment of the present invention.

The BPI object architecture in FIG. 18 is illustrated by the yellow box. The network includes:

Ledgers (one per channel—comprises of the blockchain and the state database);
Smart contract(s) (e.g., chaincode, etc.);
Peer nodes;
Ordering services;
Channels; and
Fabric Certificate Authorities.

Information about the Hyperledger can be found at hyperledger-fabric.readthedocs.io/en/release-1.2/network/network.html.

Information about blockchain can be found at graphics.reuters.com/technology-blockchaing/010070P11GN/index.html The technical architecture of hyperledger can be found at hyperledger-fabric.readthedocs.io/en/release-1.2/what-is.html#

An instance of Hyperledger is installed on a hosting environment like AWS, Microsoft, IBM or other environment. Hyperledger fabric and ordering nodes are installed. Network participants are defined by IP addresses of which a Hyperledger node or nodes are addressed using a PKI (Public Key Infrastructure). "Hyperledger Fabric assigns network roles by node type. To provide concurrency and parallelism to the network, transaction execution is separated from transaction ordering and commitment. Executing transactions prior to ordering them enables each peer node to process multiple transactions simultaneously. This concurrent execution increases processing efficiency on each peer and accelerates delivery of transactions to the ordering service." (hyperledger-fabric.readthedocs.io/en/releast-1.2/functionalities.html).

Each time channel owner or supply chain network owner wants to broadcast a time phased array plan for a response commitment for consolidation the system pushes a new share ledger to the World State (see Hyperledger fabric description below and creates a blockchain). Thus the entire master schedule could be a BPI object or as we would prefer a line item of a SKU for N number of periods of time (our default BPI).

Figure 16:
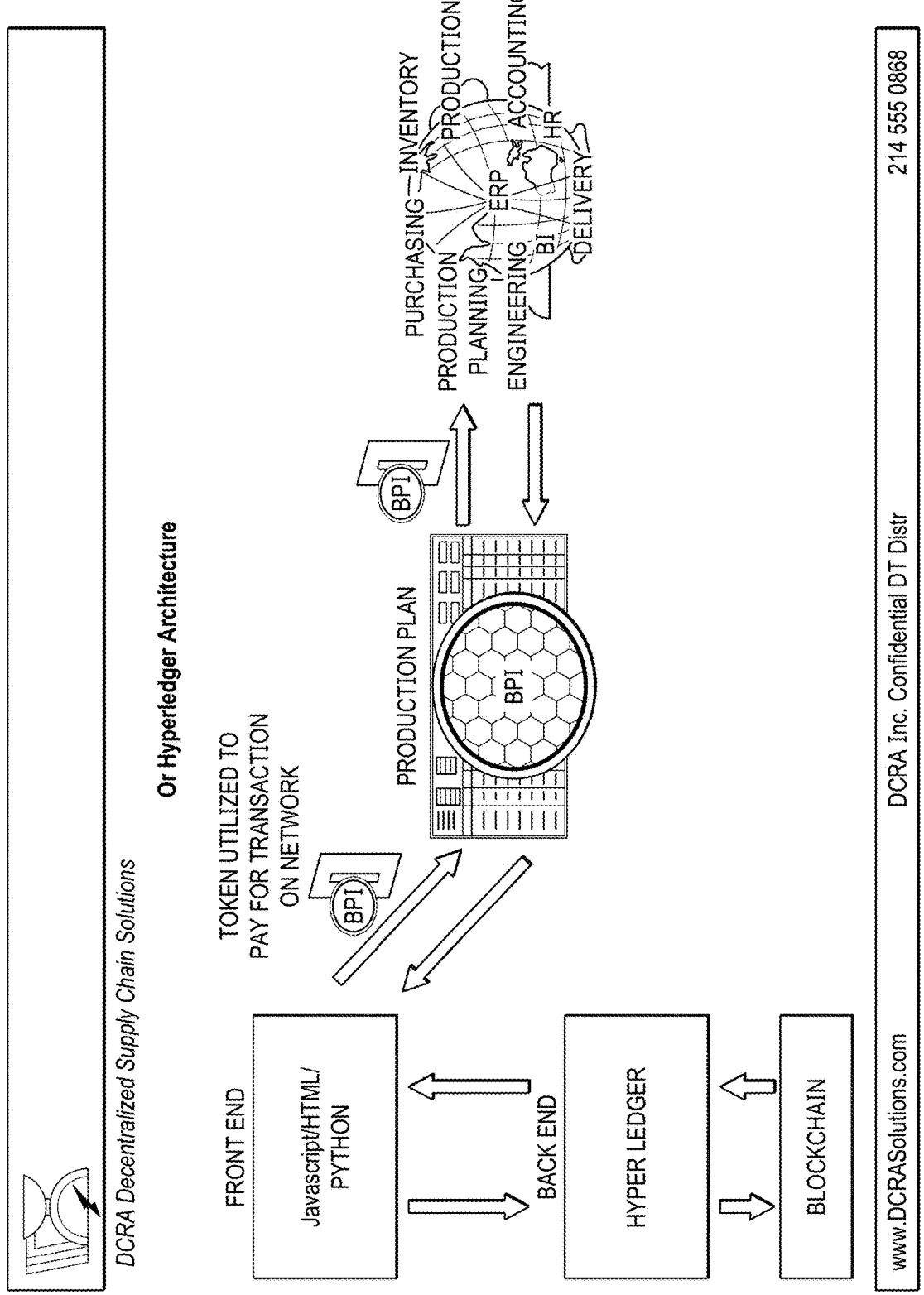
FIG. 16 illustrates an example of a Hyperledger architecture in accordance with one embodiment of the present invention.
Figure 17:
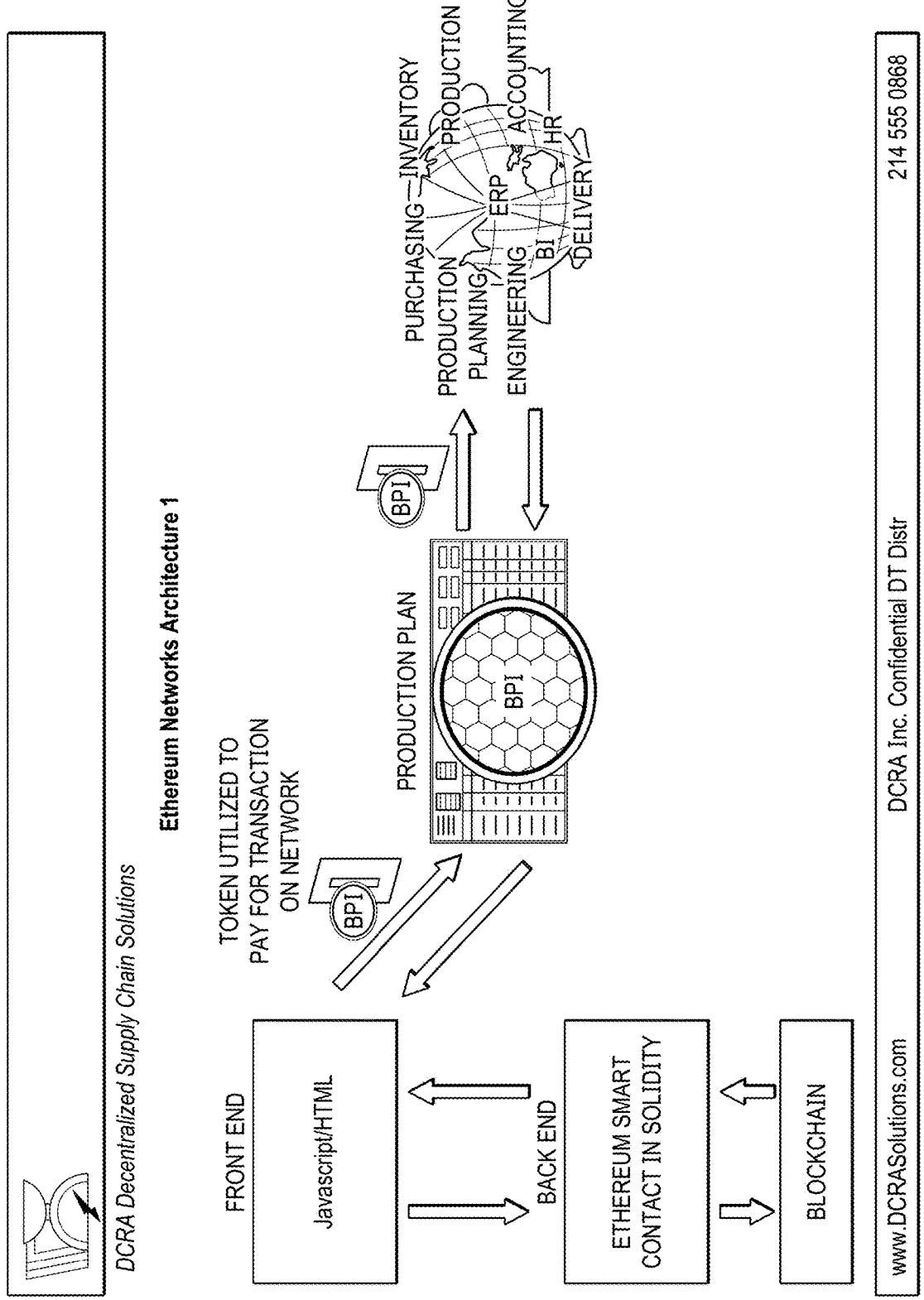
FIG. 17 illustrates an example of an Ethereum network architecture in accordance with one embodiment of the present invention.

The base level BPI object is defined as one time series array of one item (SKU) over "N" number of periods. There will be instances with the BPI object will be much larger literally a whole section of a master plan and items. However, the more the shared ledger is defined as the base BPI object, the more permutations of many shared ledgers (production) information are allowed to be consolidated and ordered off chain An example of a Hyperledger architecture is shown in FIG. 16. An example of an Ethereum network architecture is shown in FIG. 17.

A typical use case will now be described in reference to FIG. 18.

Step 1: Sales asks for 300 units in aggregate across three contract manufacturers:

|  | Period | | | | | | | | | |
|---|---|---|---|---|---|---|---|---|---|---|
| 13A-5200-117 | 1 | 2 | 3 | 4 | 5 | 6 | 7 | 8 | 9 | 10 |
| Production Commit All | 30 | 30 | 30 | 30 | 30 | 30 | 30 | 30 | 30 | 30 |

Step 2: Internal operations after S&OP process decides shipping 10 units per week over 10 weeks with one week lead time to distribution facility will meet expected sales. To not be restricted to single source of supply, the Brand owner breaks this production request into three build plans and ships to three separately owned contract manufacturers.

Step 3: A message is sent to each contract manufacturer via the blockchain to secured partners (already trust the partners and do business with them). This request for production is sent to contract manufacturing location 1:

|  | Period | | | | | | | | | |
|---|---|---|---|---|---|---|---|---|---|---|
| 13A-5200-117 | 1 | 2 | 3 | 4 | 5 | 6 | 7 | 8 | 9 | 10 |
| Production Commit All | 10 | 10 | 10 | 10 | 10 | 10 | 10 | 10 | 10 | 10 |

This request for production is sent to contract manufacturing location 2

|  | Period | | | | | | | | | |
|---|---|---|---|---|---|---|---|---|---|---|
| 13A-5200-117 | 1 | 2 | 3 | 4 | 5 | 6 | 7 | 8 | 9 | 10 |
| Production Commit All | 15 | 15 | 15 | 15 | 15 | 15 | 15 | 15 | 15 | 15 |

This request for production is sent to contract manufacturing location 3:

|  | Period | | | | | | | | | |
|---|---|---|---|---|---|---|---|---|---|---|
| 13A-5200-117 | 1 | 2 | 3 | 4 | 5 | 6 | 7 | 8 | 9 | 10 |
| Production Commit All | 5 | 5 | 5 | 5 | 5 | 5 | 5 | 5 | 5 | 5 |

All three contract manufacturing locations use different production planning systems.

Step 4: Each contract manufacturer will have an off blockchain "wallet" to receive the array of data (spreadsheet) and will either use our utility or their production planning software utility to import the request into their production system. Once imported into their production planning, scheduling, MPS based on their unique needs they will respond with the quantity they can commit to. Because quantity is generally not disputed but quantity per time period is generally not held, the following is assumed.

Step 5: Each plant responds with three days or sooner.

Contract manufacturing location 1 responds:

|  | Period | | | | | | | | | |
|---|---|---|---|---|---|---|---|---|---|---|
| 13A-5200-117 | 1 | 2 | 3 | 4 | 5 | 6 | 7 | 8 | 9 | 10 |
| Production Commit CM 1 | 10 | 10 | 10 | 10 | 10 | 10 | 10 | 10 | 10 | 10 |
|  | 0 | 0 | 0 | 0 | 45 | 11 | 11 | 11 | 11 | 11 |

Contract manufacturing location 2 responds:

|  | Period | | | | | | | | | |
|---|---|---|---|---|---|---|---|---|---|---|
| 13A-5200-117 | 1 | 2 | 3 | 4 | 5 | 6 | 7 | 8 | 9 | 10 |
| Production Commit CM 2 | 15 | 15 | 15 | 15 | 15 | 15 | 15 | 15 | 15 | 15 |
|  | 15 | 15 | 15 | 15 | 15 | 0 | 0 | 0 | 0 | 0 |

Contract manufacturing location 3 responds:

|  | Period | | | | | | | | | |
|---|---|---|---|---|---|---|---|---|---|---|
| 13A-5200-117 | 1 | 2 | 3 | 4 | 5 | 6 | 7 | 8 | 9 | 10 |
| Production Commit CM 3 | 5 | 5 | 5 | 5 | 5 | 5 | 5 | 5 | 5 | 5 |
|  | 5 | 5 | 5 | 5 | 5 | 5 | 5 | 5 | 5 | 5 |

Step 7: The utility we provide with the blockchain will extract the data from each CM's "production wallet" and will be sent encrypted via the blockchain network/Internet to the Brand manager central location.

Step 8: Using the utility provided as off blockchain, each response is synchronized and uploaded to the S&OP staging data area. The planners review each response and consolidate the response into the S&OP production commitment section and auto reconcile by hitting a button. This functionality is all done off blockchain.

The consolidated commitment plan will look like this:

|  | Period | | | | | | | | | |
|---|---|---|---|---|---|---|---|---|---|---|
| 13A-5200-117 | 1 | 2 | 3 | 4 | 5 | 6 | 7 | 8 | 9 | 10 |
| Production | 30 | 30 | 30 | 30 | 30 | 30 | 30 | 30 | 30 | 30 |
| Commit CM ALL sites | 20 | 20 | 20 | 20 | 65 | 26 | 26 | 26 | 26 | 26 |
| Shortage flag | 10 | 10 | 10 | 10 | +35 | 4 | 4 | 4 | 4 | 4 |
| Cumulative short | 10 | 20 | 30 | 40 | 0 | 3 | 8 | 12 | 16 | 20 |

The Brand manager may accept this schedule as fully adequate to meet the demand or may repeat the cycle to negotiate with contract manufacturer(s).

Step 9: To test the public vs. private blockchain performance, the incremental short balance in the above table was put out in a public network for contract manufacturers to identify additional manufacturing capacity. The reason for this additional step is both functional and to test transaction ledger speed on trusted partner network vs. open untrusted network.

Step 10: To test using EPBI object outside blockchain to send "spreadsheet" array in native form to another division of Brand owner company using a dissimilar enterprise production planning system and get commitments via a traditional messaging approach. Consolidate this back to totals.

The major difference in this scenario is it is precisely how the real world works. The algorithms in the brand managers S&OP are not used at this point it purely is locking in attainment promised by the CM manufacturers and will proceed to commit other resources in the supply chain and sales to this plan.

The existence of this distributed block chain array scheduler will allow this negotiation to happen largely without human interference and without error as these time phased array additions, subtractions and adjustments are all difficult to keep manually. Many more SKU's maybe 1000's are shipped back and forth in a planning period. The SKU's will link to planning bill of material information that the CM's largely already have in their production systems but likely will be available also.

There will be subcomponent suppliers A, B and C as illustrated in the diagram. All of these suppliers will be given access to the demand signal from the brand manager. They may or may not have systems to interpret component quantity demand from finished good demand. If said component supplier does not have this planning bill of material they will be able to pull it from the blockchain or off blockchain application to make the calculation. In a typical deployment, there could be a geometrically large volume of nodes and thus the blockchain design created and designed to scale.

Sample Base BPI Object Defined as JSOM
Communicate on Chain in Parallel to all Block Visualization

```
{
    "version": "1.0a",
    "date": "2018-02-05T05:17:33.187Z",
    "src": "5994471abb01112afcc18159f6cc74b4f511b99806da59b3caf5a9c173cacfc5",
    "dst": "ba7816bf8f01cfea414140de5dae2223b00361a396177a9cb410ff61f20015ad",
    "type": "commit",
    "part": "13A-5200-117",
    "period":
[{"qty": "5","lead": "2"},{"qty": "5","lead": "2"},{"qty": "5","lead": "2"},{"qty": "5","lead": "2"},{"qty": "5","lead": "2"}]
}
```

Figure 19:
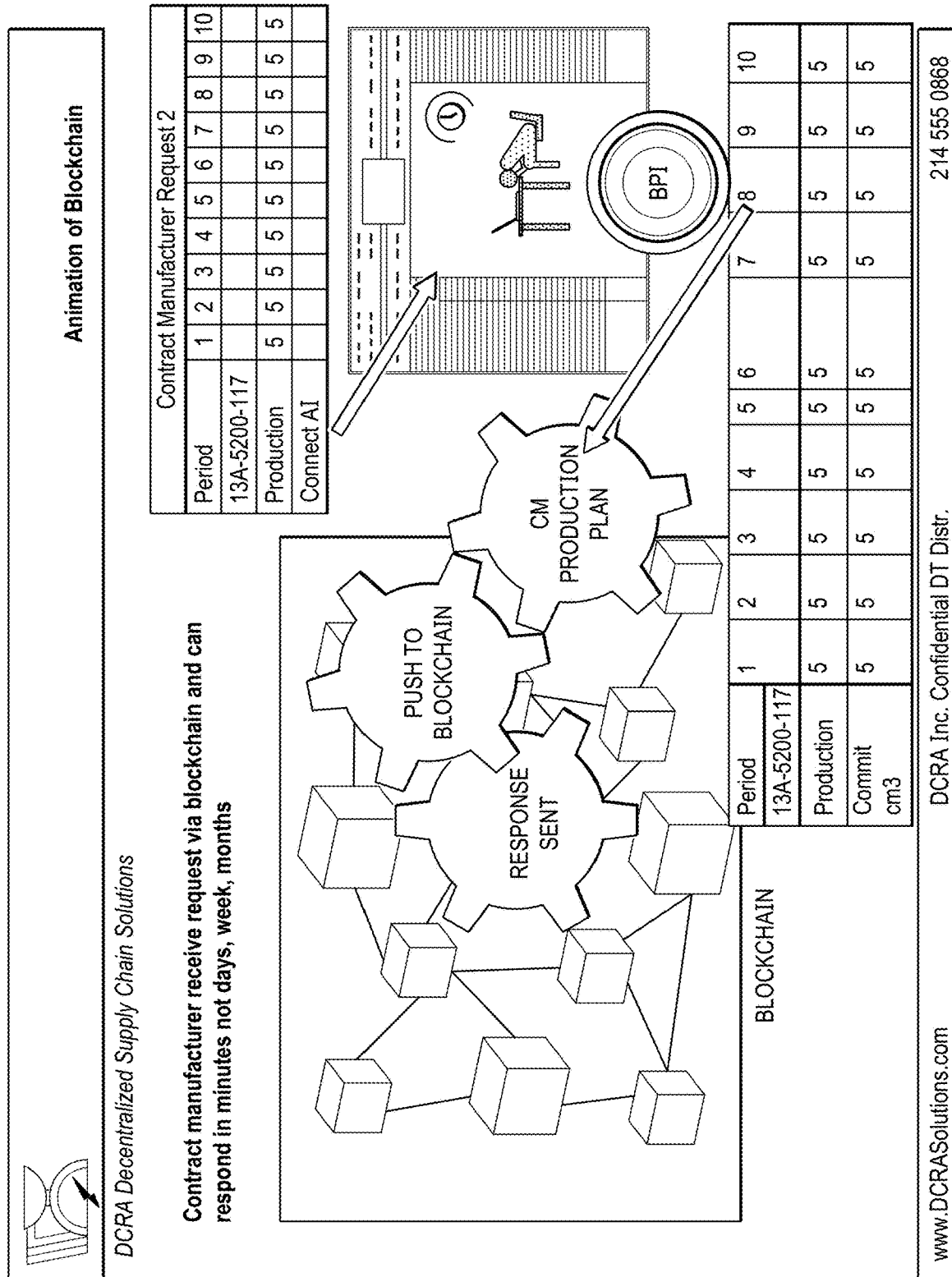
FIG. 19 illustrates a contract manufacturer receiving a request via blockchain and responding in minutes, not days, weeks or months in accordance with one embodiment of the present invention.
Figure 20:
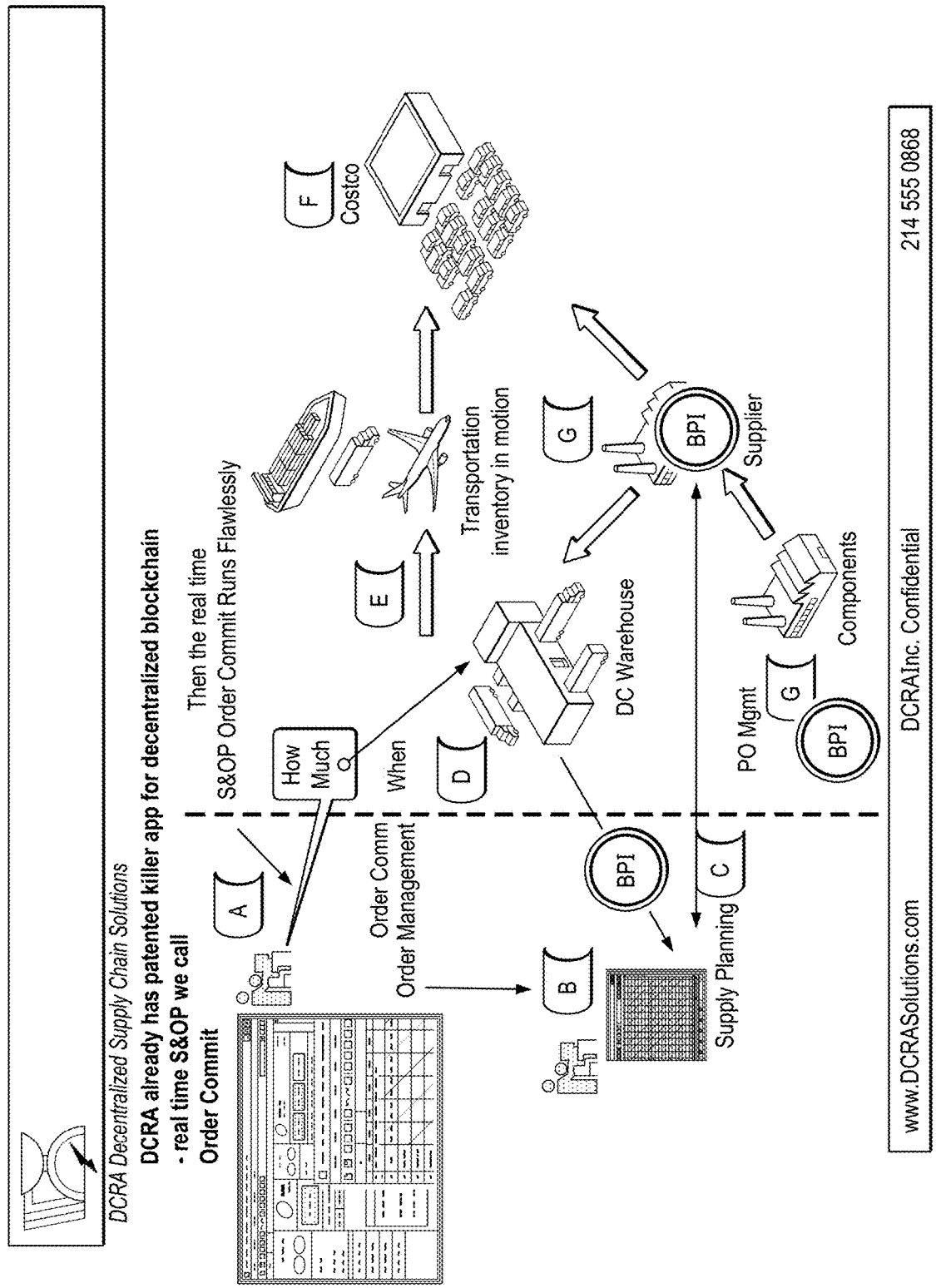

Off chain code to push and pull data on and off the blockchain at the response nodes/roles (e.g. a contract manufacturer or plant responding to demand signal request) as shown in FIG. 19. Off chain code to consolidate many BPI's from many nodes from blockchain to an ordering database either in the State DB or a direct manipulation of data from the State DB. These can then organize the response in a method that respects latest greatest information ignoring older duplicate or meaningless responses.

The new way BPI object enabled production capacity and commitment conversation between financial entities. The data of the use case as represented above when HP need to order 300 laptops to be produced by three independent contract manufacturers and how planned production is shared, committed or commented on by contract manufacturers and then negotiated as shown in FIGS. 20-28.

A new Plan is configured, checked out, data assembled then planning is started. Plan is completed and established as released plan by the brand owner HP Step 1: S&OP Plan goes through planning cycle and becomes final and approved as shown in FIG. 22.

Figure 23A:
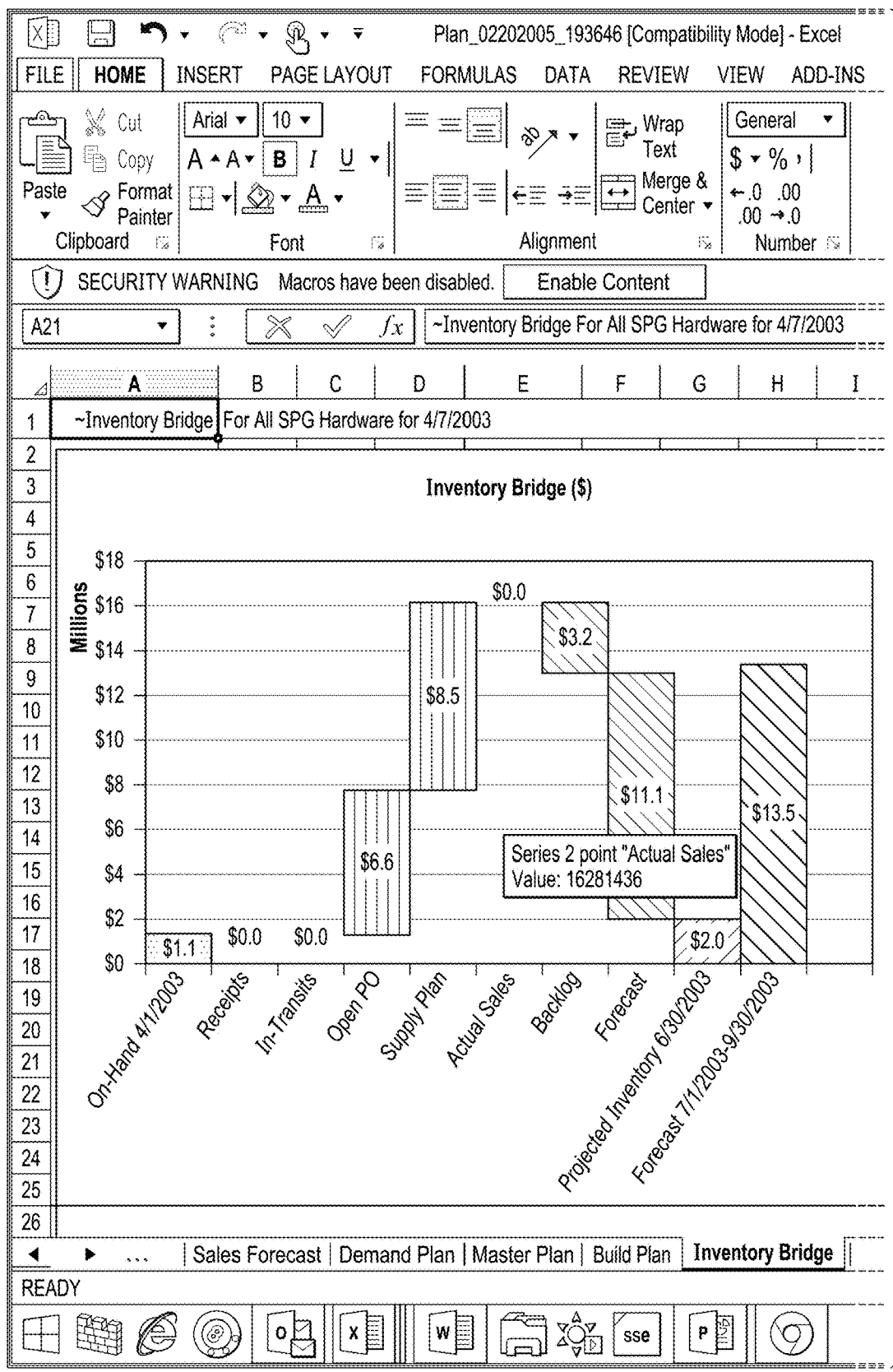
Figure 25:
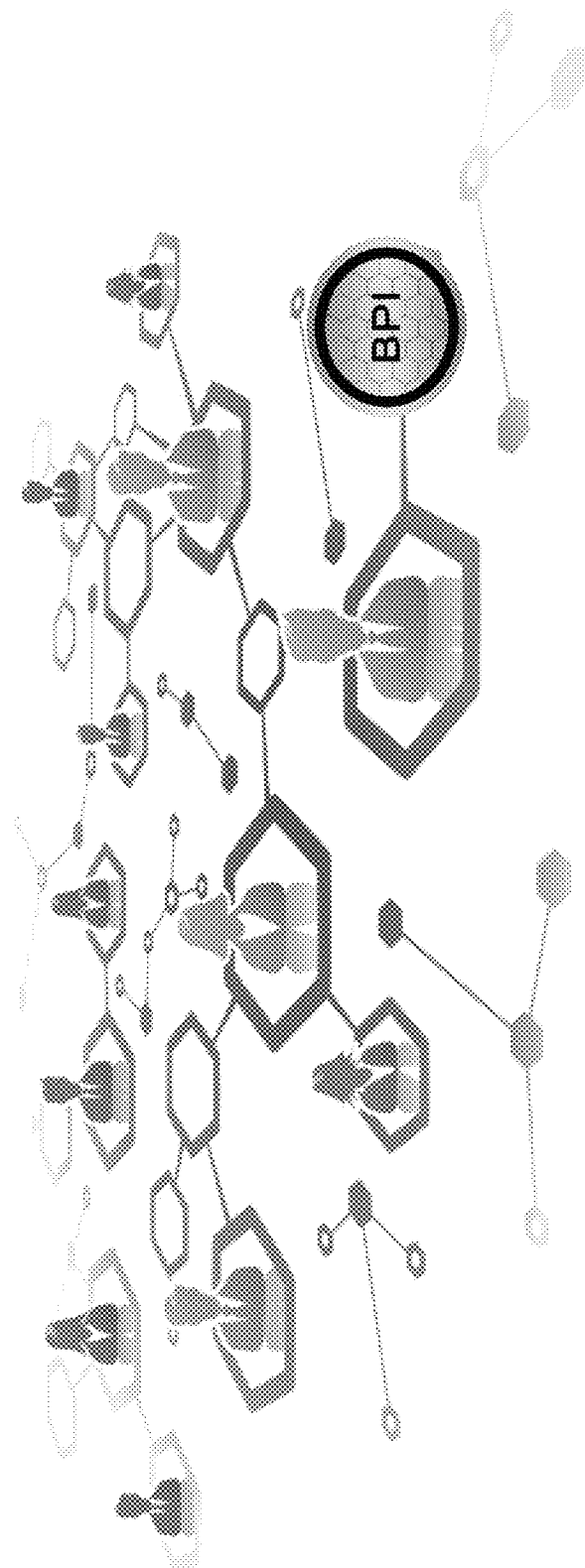

The real test of a good S&OP is it meeting customer supply needs but in equilibrium of liabilities vs. assets. As shown in FIG. 23, an Inventory Bridge from DCRA S&OP plan shows a plan where long term demand is pegged to various levels of liabilities (commitments from production). This can be in house production or outsourced production. The BPI object will greatly reduce the time it takes to get firm commitments from suppliers and thereby improving the accuracy and precision of the plan as well as make the plan more nimble if and when demand changes. The S&OP solution allows virtually unlimited views/reports/categorization of the plan.

Step 2: The various partners (contract manufacturers, internal manufacturing, component suppliers, logistics providers) are notified with their "build plan" instructions, which is generally a subset of overall plan. An example build plan output from actual plan is shown in FIG. 24. The total is allocated to three contract manufacturers.

Figure 21:
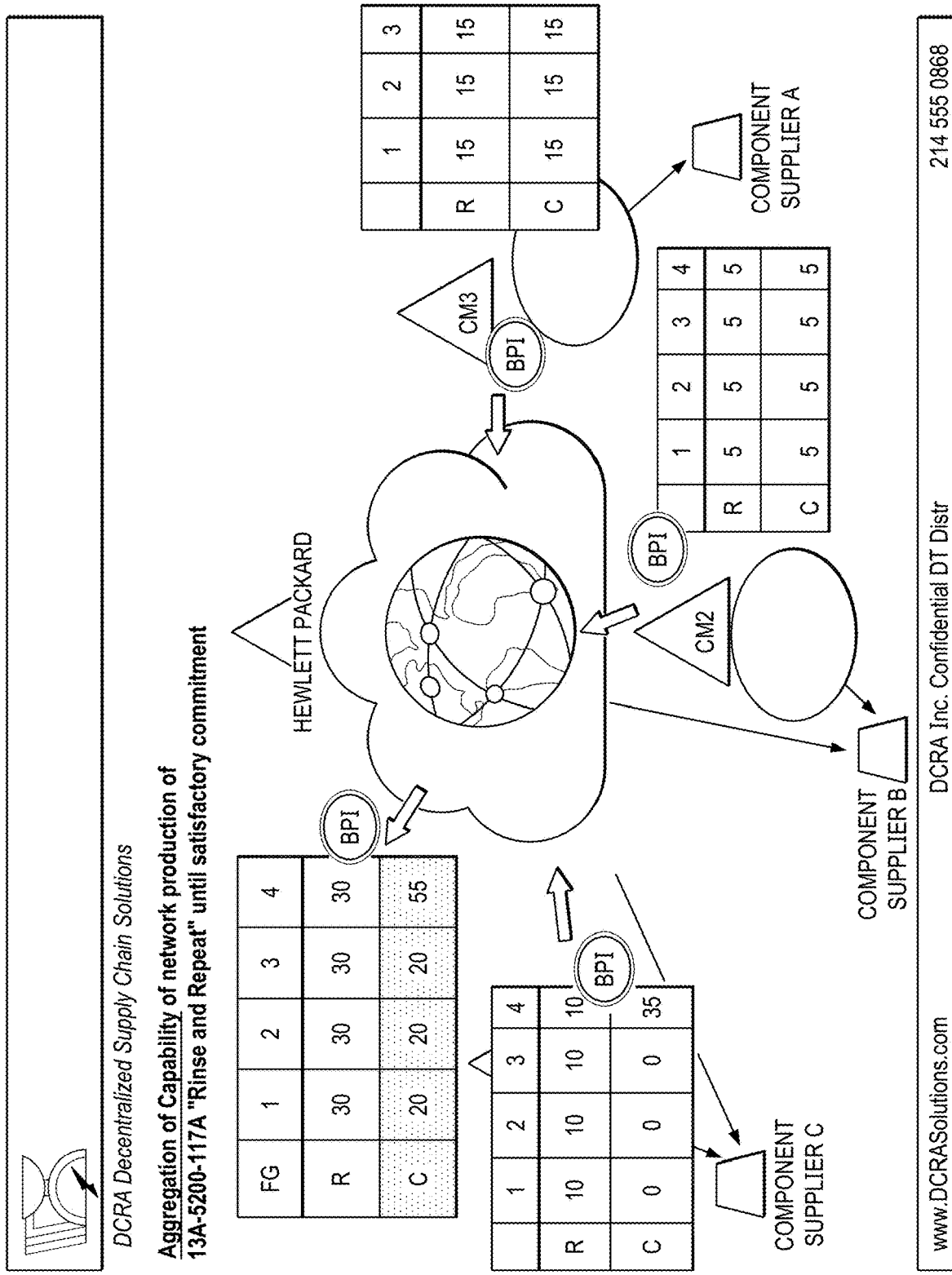

Step 4: The Blockchain array is populated with build plan and the blockchain technology disseminates this production array to all the nodes in the blockchain/supply chain. There will be more "data" nodes then supply chain participants as one supply chain participant (node) might have many different roles to act and thus data nodes as shown in FIG. 21. Json Object

```
{
  "version": "1.0a",
  "date": "2018-02-05T05:17:33.187Z",
  "src": "5994471abb01112afcc18159f6cc74b4f511b99806da59b3caf5a9c173cacfc5",
  "dst": "ba7816bf8f01cfea414140de5dae2223b00361a396177a9cb410ff61f20015ad",
  "type": "REQUEST",
  "part": "13A-5200-117",
  "period":
[{"qty": "5","lead": "2"},{"qty": "5","lead": "2"},{"qty": "5","lead": "2"},{"qty": "5",
"lead": "2"},{"qty": "5","lead": "2"}]
}
```

Once the build plan production arrays are extracted, transformed and loaded onto a blockchain array the data is propagated through the blockchain nodes to all approved, interested parties. In this simplified flow we will primarily look at the contract manufacturers receipt of the array.

Figure 26:
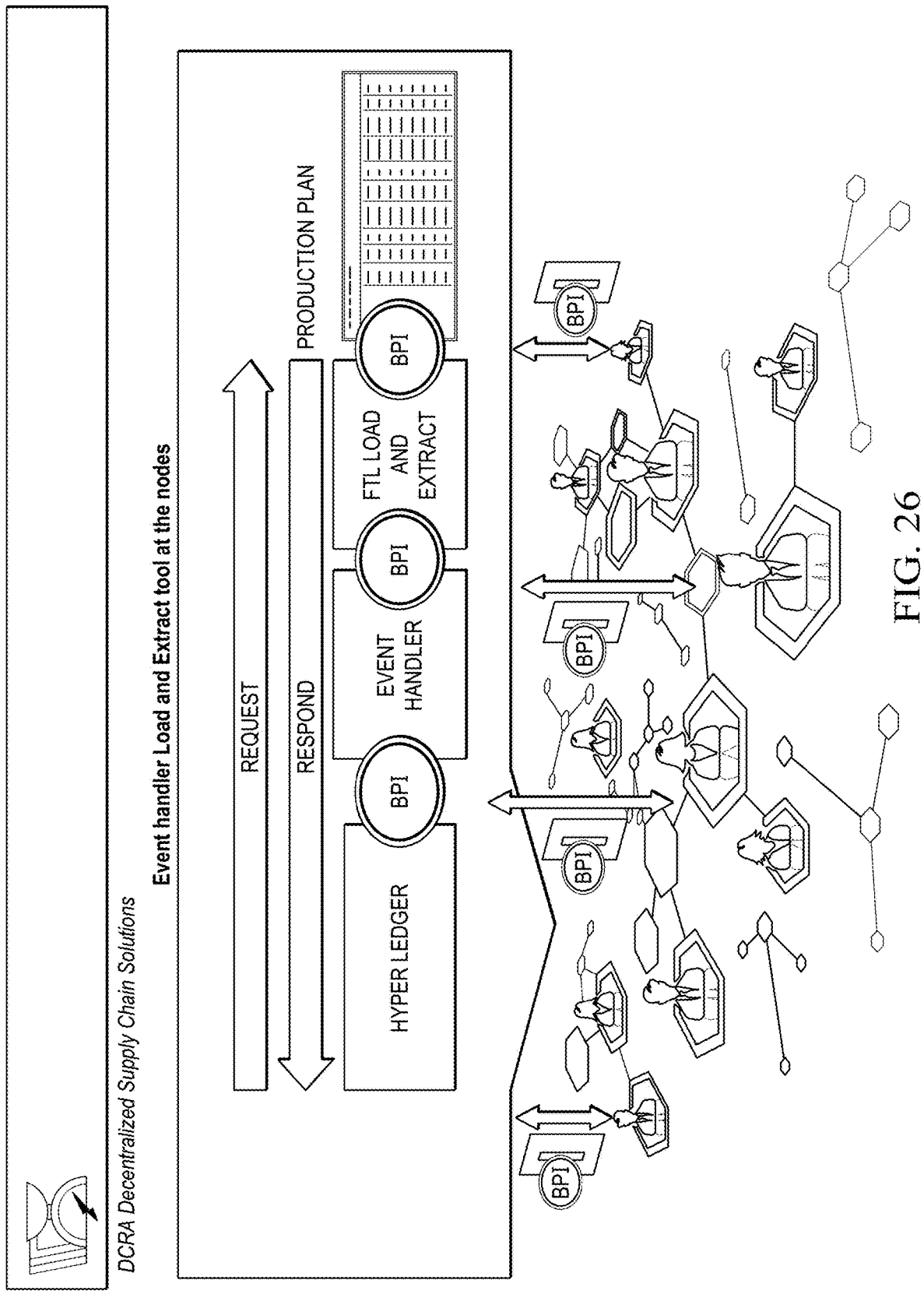
Figure 27:
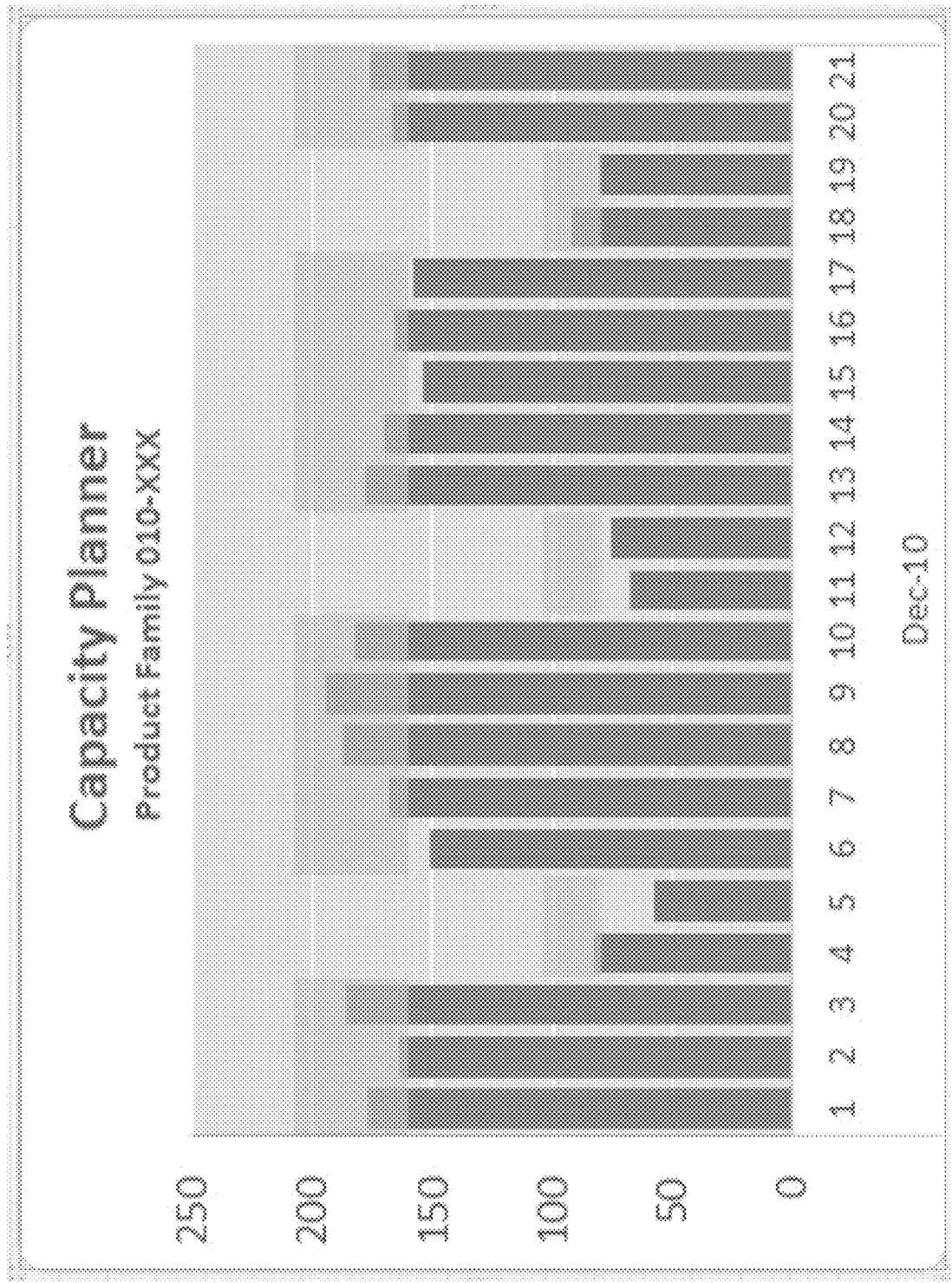

Step 5: Blockchain array is received by all supply chain nodes (and blockchain trust nodes) and is sent to response tool of node as shown in FIG. 26.

Step 6: Plan by local contract manufacturer. Tools used by various manufacturers and even within various production groups, facilities, business groups may vary but the BPI object will be a universal representation of said plan. The production party will load into their tool ranging from a whiteboard/spreadsheet to the most sophisticated AI based APS system for analysis. See FIG. 27.

Step 7: After planning is done by response node a response it re-communicated through the blockchain back to brand owner.

Step 8: Reload back onto chain.

Step 9: Communicate on chain in parallel to all block visualization

```
{
  "version": "1.0a",
  "date": "2018-02-05T05:17:33.187Z",
  "src": "5994471abb01112afcc18159f6cc74b4f511b99806da59b3caf5a9c173cacfc5",
  "dst": "ba7816bf8f01cfea414140de5dae2223b00361a396177a9cb410ff61f20015ad",
  "type": "commit",
  "part": "13A-5200-117",
  "period":
[{"qty": "5","lead": "2"},{"qty": "5","lead": "2"},{"qty": "5","lead": "2"},{"qty": "5",
"lead": "2"},{"qty": "5","lead": "2"}]
}
```

Step 10: Blockchain is insert directly to S&OP plan out put as revised commitment or is inserted into plan and replanning done to meet demand and supply. The commitment array can literally white out a portion of the requested master production schedule and replace it with the contract manufacturer's commitment. Balance this against sales and either accept or rinse and repeat with the manufacturing entity.

Step 11: Illustrate potential for on chain Smart Contract potential for simple rules to be engaged based on distributed, decentralized data updates. Example Smart contract: Automatic transport lead-time escalation from ocean to air freight for late production; and payment upon commitment.

Step 12: Illustrate use of tokenized BPI object to use BPI object to obtain additional capacity bids when primary suppliers come up short of available production/inventory.

Step 12a: Use search function to look into catalog of contract manufacturers by industry, by geography, by functional expertise.

Step 12b: Select contact info of contract manufacturer or demand owner and see if there is interest general availability.

Step 12c: Send tokenized BPI object schedule and follow same model as private network above.

Step 12d: For full public coin model the process will likely start with step 12 then go to step 1. For private network step 12 only used if capacity not available with trusted sources.

Step 13: Envision new type of S&OP part quantitative part communication based. In essence a negotiation enabled S&OP plan.

Figure 28:
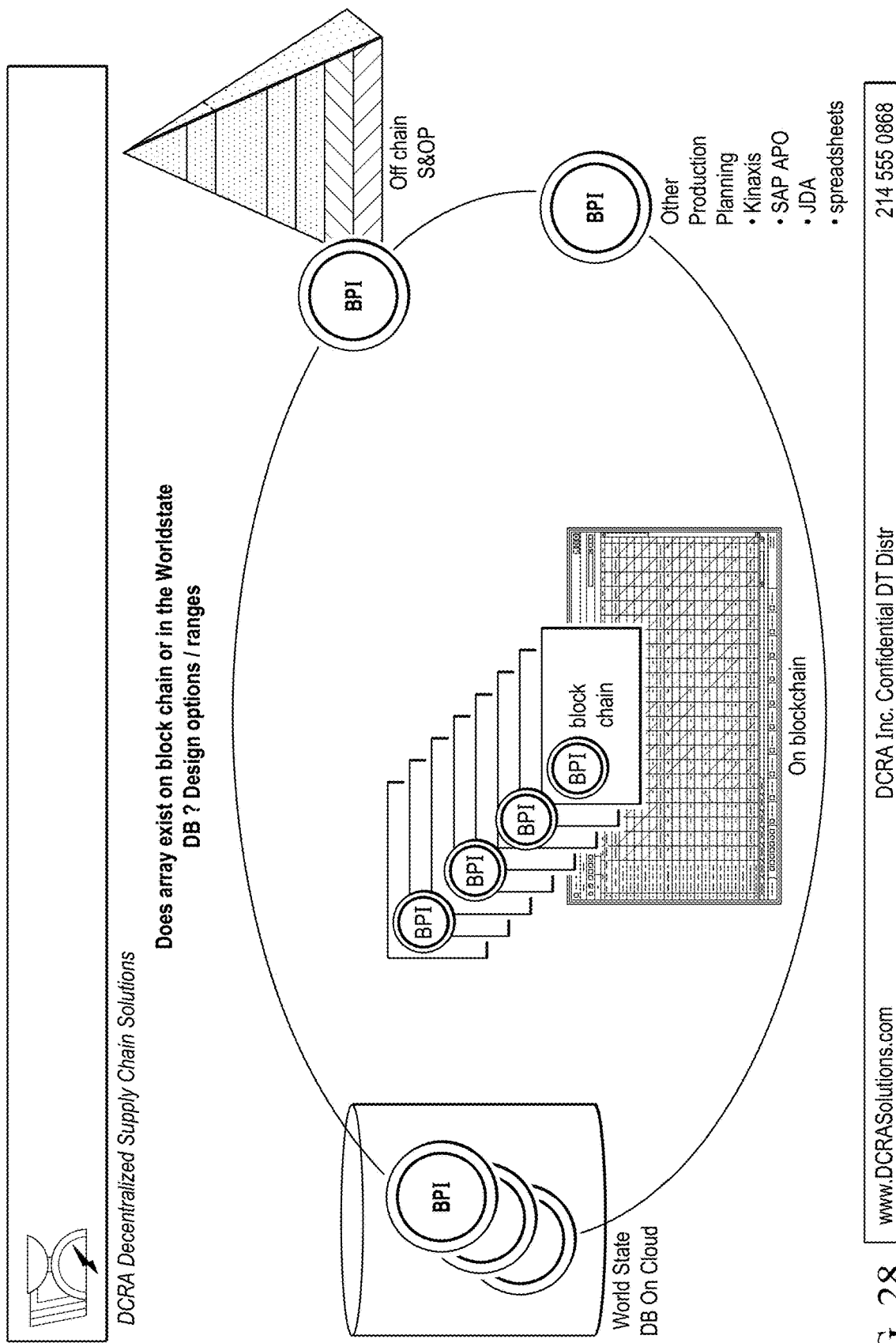

An overview of the process is shown in FIG. 28.

Figure 29:
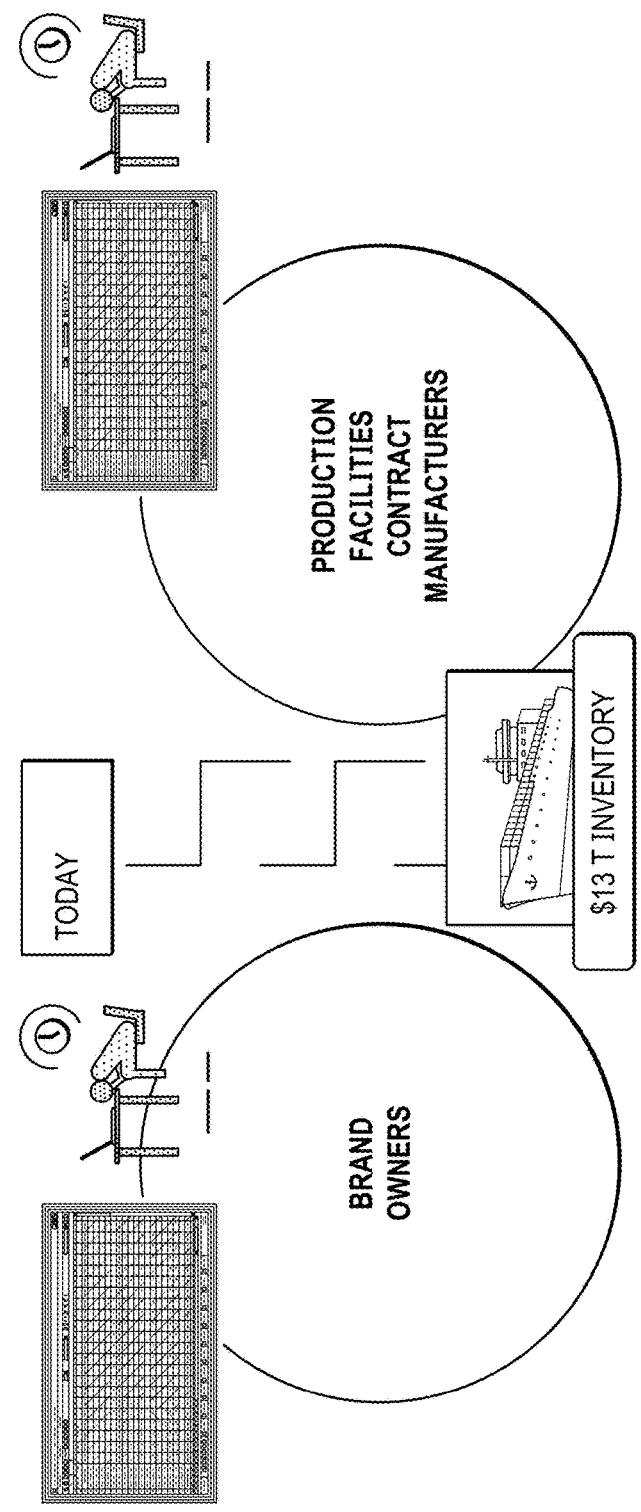
FIG. 29 illustrates a current stat of sharing product data between entities in which the BPI object and blockchain create efficient decentralized supply chain collaboration in accordance with one embodiment of the present invention.
Figure 30:
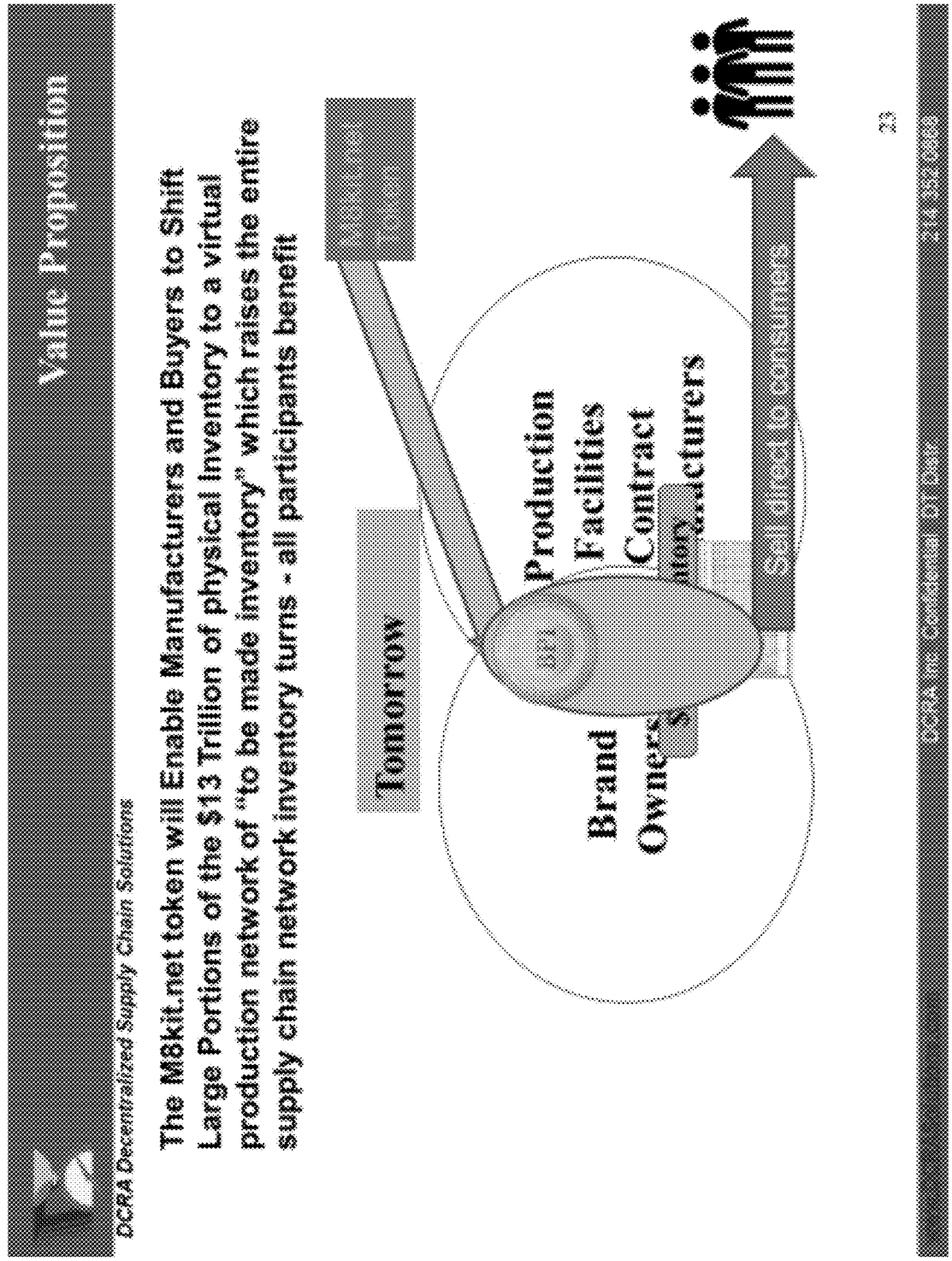
FIG. 30 illustrates a phase 1 of BPI object enabled production sharing in accordance with one embodiment of the present invention.
Figure 32:
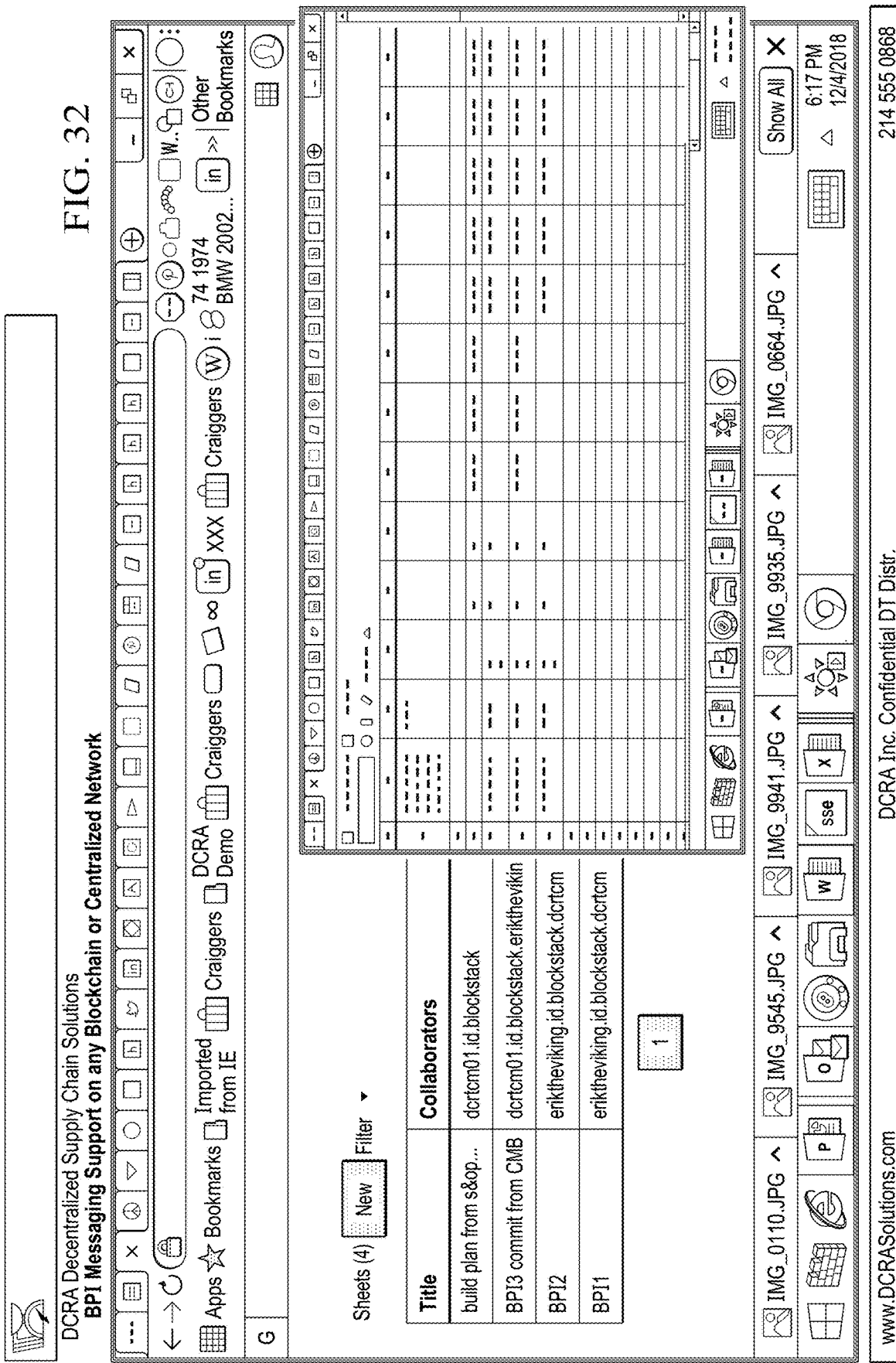
FIG. 32 illustrates BPI object messaging support on any blockchain or centralized network in accordance with one embodiment of the present invention.

FIG. 29 illustrates a current stat of sharing product data between entities in which the BPI object and blockchain create efficient decentralized supply chain collaboration. FIG. 30 illustrates a phase 1 of BPI object enabled production sharing. FIG. 31 illustrates how the BPI object manages decentralized virtual inventory. FIG. 32 illustrates BPI object messaging support on any blockchain or centralized network.

Figure 33:
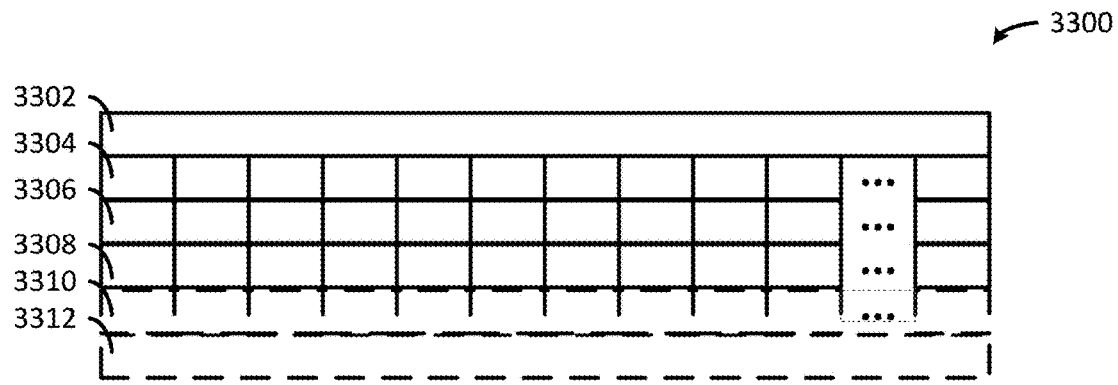
FIG. 33 is a block diagram of a data structure for a decentralized ledger interchange object, which is also referred to as the BPI object, in accordance with one embodiment of the present invention.

FIG. 33 is a block diagram of a data structure for a decentralized ledger interchange object 3300, which is also referred to as the BPI object, in accordance with one embodiment of the present invention. The decentralized ledger interchange object 3300 includes a first data field 3302, a set of second data fields 3304, a set of third data fields 3306, and a set of fourth data fields 3308. The first data field 3302 contains an identifier for an item. The set of second data fields 3304 are linked to the first data field 3302. Each second field 3304 contains one of a set of time periods. Each third data field 3306 is linked to a corresponding second data field 3304, and each third data field 3306 contains a requested quantity of the item for a corresponding time period. Each fourth data field 3308 is linked to the corresponding second data field 3304, and each fourth data field 3308 contains a committed quantity of the item for the corresponding time period. Note that the decentralized ledger interchange object 3300 may include additional data fields and the data can be arranged differently as long as the links are maintained. For example, in some embodiments, the data structure 3300 may include a set of fifth data fields 3310. Each fifth data field 3310 is linked to the corresponding second data field 3304, and each fifth data field 3310 contains a price for the corresponding time period. Likewise, in some embodiments, the data structure 3300 may include one or more sixth data fields 3312. The sixth data fields 3312 are linked to the first data field 3302, and each sixth data field 3312 contains one or more terms and conditions, one or more specifications for the item, a shipping and handling price, a tax amount, a link to other data or information stored remotely, or a link to other decentralized ledger interchange objects. Other information or data may be included.

In one aspect, the first data field, the set of second data fields, and the set of third data fields are filled in by a first processor, and the set of fourth data fields are filled in by a second processor. In another aspect, the first data field, the set of second data fields and the set of third data fields, and the set of fourth data fields are configured for automatic input into or export from a sales and operations planning system. In another aspect, the first data field, the set of second data fields and the set of third data fields, and the set of fourth data fields are configured for automatic input into or export from a sales plan, an inventory plan, a customer lead time plan, a new product development plan, a strategic initiative plan, or a financial plan. In another aspect, the first data field, the set of second data fields and the set of third data fields, and the set of fourth data fields are configured for automatically updating an electronic commerce application. In another aspect, the identifier for the item comprises a stock keeping unit number, a production unit number, a part number, or a model number. In another aspect, the decentralized ledger interchange object is configured for use in a decentralized ledger. In another aspect, the decentralized ledger can be hyper ledger, blockchain, quorum or other known or unknown decentralized ledger. In another aspect, the decentralized ledger interchange object is detachable from the decentralized ledger. In another aspect, the detached decentralized ledger interchange object is reconcilable back to a source of the decentralized ledger interchange object. In another aspect, the detached decentralized ledger interchange object is synchronized with other information without a link to the source of the decentralized ledger interchange object. In another aspect, the decentralized ledger interchange object is an asynchronous data object that is self-reconciling.

This data object has embedded within it structures, links, relationships and other information such that it can be detached from its "Blockchain" or other decentralized network but then later reconciled back to its source and synchronized with other detached production schedule information without having to be tethered or linked to its source to synchronize. It is an asynchronous data object that self-reconciles.

Figure 34:
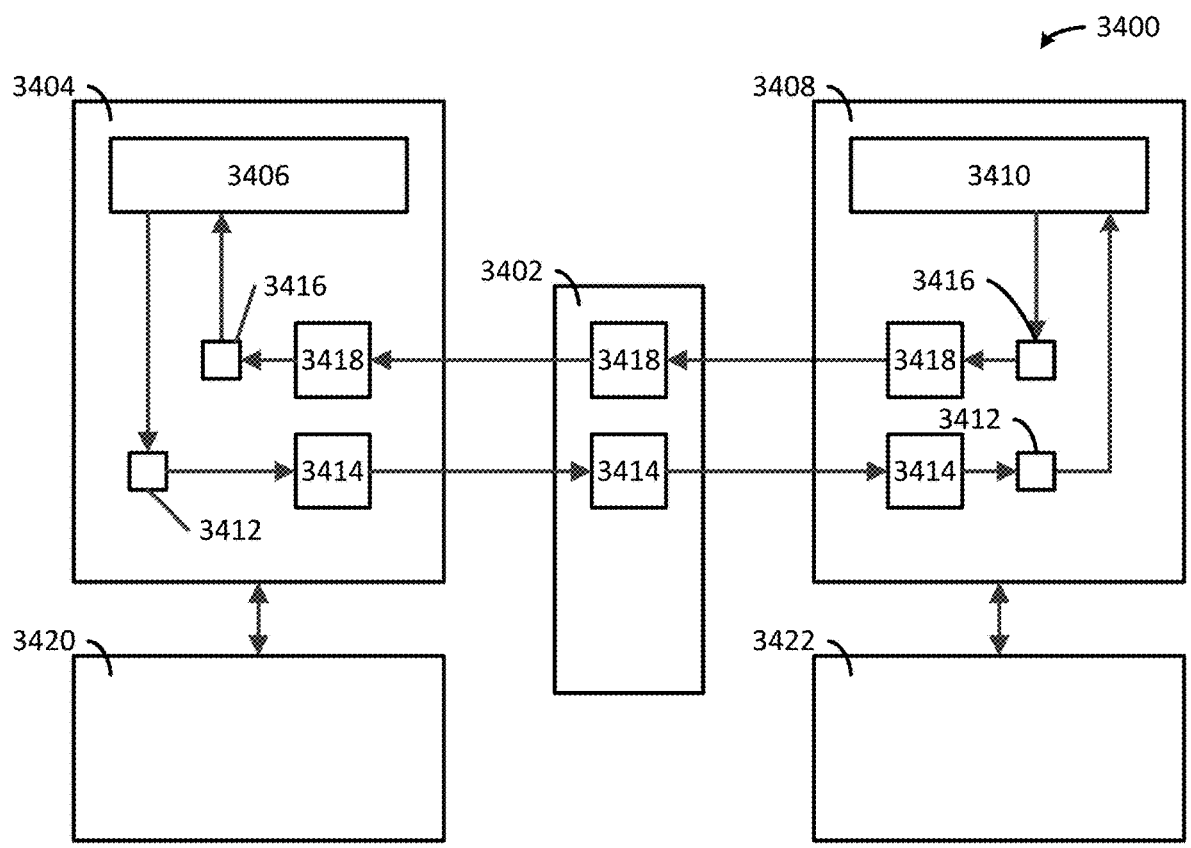
FIG. 34 is a block diagram of a computer system that uses a decentralized ledger in accordance with one embodiment of the present invention.

FIG. 34 is a block diagram of a computer system 3400 that uses a decentralized ledger 3402 in accordance with one embodiment of the present invention. The computer system 3400 includes a first computer system 3404 having one or more first processors 3406 and one or more second computer systems 3408, each second computer system 3408 having one or more second processors 3410. The one or more first processors 3406: (a) generate a first decentralized ledger interchange object 3412, (b) generate a first block 3414 for the first decentralized ledger interchange object 3412, (c) insert the first block 3414 onto the decentralized ledger 3402, and (d) make the first block 3414 visible to the one or more second computer systems 3408. The one or more second processors 3408: (a) access the first decentralized ledger interchange object 3412 in the first block 3414 of the decentralized ledger 3402, (b) generate a second decentralized ledger interchange object 3416 based on the first decentralized ledger interchange object 3412, (c) generate a second block 3418 for the second decentralized ledger interchange object 3416, (d) insert the second block 3418 onto the decentralized ledger 3402, and (e) make the second block 3418 visible to the first computer system 3404. The first and second decentralized ledger interchange objects 3412 and 3416 include an identifier for an item, a set of time periods, a requested quantity of the item for each time period, and a committed quantity of the item for each time period. The first computer system 3404 can be communicably coupled to other internal or external systems 3420. Likewise, the second computer system 3408 can be communicably coupled to other internal or external systems 3422.

In one aspect, the first and second decentralized ledger objects further comprise a price for each time period. In another aspect, the first and second decentralized ledger objects further comprise one or more terms and conditions, one or more specifications for the item, a shipping and handling price, a tax amount, a link to other data or information stored remotely, or a link to other decentralized ledger interchange objects. In another aspect, the one or more first processors generate at least one cryptographic key for the second computer system, and encrypt the first block using the cryptographic key, and the cryptographic key enables the one or more second processors to view blocks on the distributed ledger and to insert blocks onto the distributed ledger. In another aspect, the one or more first processors input the identifier for the item, the set of time periods, and the requested quantity of the item for each time period into the first decentralized ledger interchange object, and the one or more second processors input the committed quantity of the item for each time period into the second decentralized ledger interchange object. In another aspect, the one or more first processors generate the first decentralized ledger interchange object using data from a sales and operations planning system, and update the sales and operations planning system using data from the second decentralized ledger interchange object. In another aspect, the one or more first processors reconcile and synchronize the second decentralized ledger object received from multiple second computer systems. In another aspect, the first decentralized ledger object and the second decentralized ledger object are automatically input into or exported from a sales plan, an inventory plan, a customer lead time plan, a new product development plan, a strategic initiative plan, or a financial plan. In another aspect, the first decentralized ledger object and the second decentralized ledger object a exported to a static non-network production system or supply chain system as a direct data feed to synchronize future inventory requirements from another party, source, block, node or location. In another aspect, the second decentralized ledger object is used to automatically update an electronic commerce application. In another aspect, the decentralized ledger is used as a source of data in a manufacturing process, a supply chain, a sales and operations planning time series plan, or a schedule.

The decentralized ledger object can be generated from a Blockchain or other decentralized network supported system, but also can be exported to static non-network production/supply chain systems as a direct data feed to synchronize future inventory requirements from another party/source/block/node/location. This conversation can repeat itself over and over such as would occur between emails or requests and promises with a spoken language.

Figure 35:
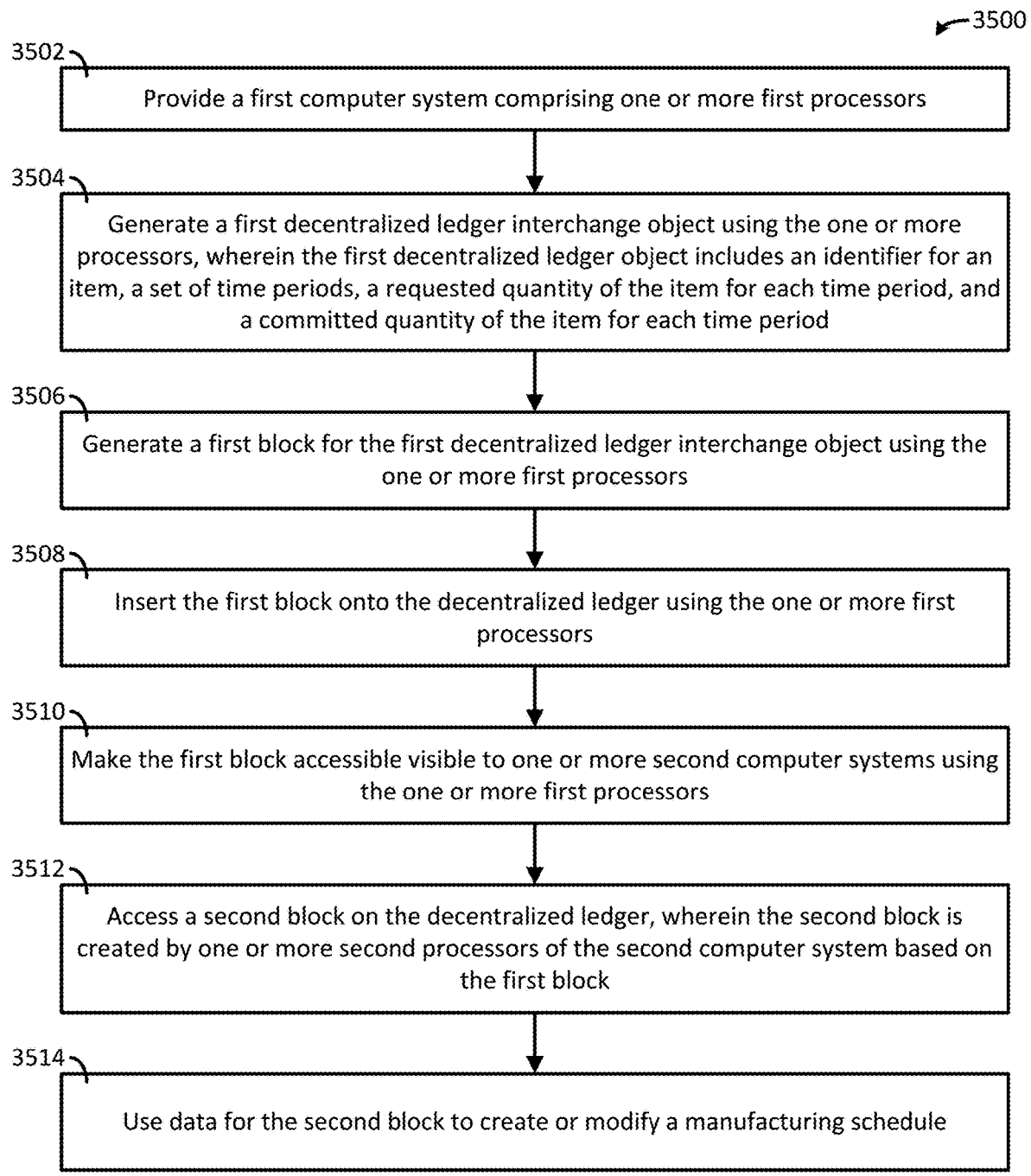
FIG. 35 is a flow chart of a computerized method for time-based manufacturing in accordance with one embodiment of the present invention.

FIG. 35 is a flow chart of a computerized method 3500 for time-based manufacturing in accordance with one embodiment of the present invention. A first computer system comprising one or more first processors is provided in block 3502. A first decentralized ledger interchange object is generated using the one or more first processors in block 3504. The first decentralized ledger interchange object includes an identifier for an item, a set of time periods, a requested quantity of the item for each time period, and a committed quantity of the item for each time period. A first block is generated for the first decentralized ledger interchange object using the one or more first processors in block 3506. The first block is inserted onto the decentralized ledger using the one or more first processors in block 3508. The first block is made visible to one or more second computer systems using the one or more first processors in block 3510. A second block on decentralized ledger is accessed in block 3512. The second block is created by one or more second processors of the second computer system based on the first block. The data from the second block is used to create or modify a manufacturing schedule in block 3514.

In one aspect, the method further includes: accessing the first decentralized ledger interchange object in the first block of decentralized ledger using the one or more second processors; generating the second decentralized ledger interchange object based on the first decentralized ledger interchange object using the one or more second processors; generating a second block for the second decentralized ledger object using the one or more second processors; inserting the second block onto the decentralized ledger using the one or more second processors; and making the second block visible to the first computer system. In another aspect, the first and second decentralized ledger objects further comprise a price for each time period. In another aspect, the first and second decentralized ledger objects further comprise one or more terms and conditions, one or more specifications for the item, a shipping and handling price, a tax amount, a link to other data or information stored remotely, or a link to other decentralized ledger interchange objects. In another aspect, the method further includes: generating at least one cryptographic key for the second computer system; encrypting the first block using the cryptographic key; and the cryptographic key enables the one or more second processors to view blocks on the distributed ledger and to insert blocks onto the distributed ledger. In another aspect, the method further includes: inputting the identifier for the item, the set of time periods, and the requested quantity of the item for each time period into the first decentralized ledger interchange object using the one or more processors; and inputting the committed quantity of the item for each time period into the second decentralized ledger interchange object using the one or more second processors. In another aspect, the method further includes: generating the first decentralized ledger interchange object using data from a sales and operations planning system; and updating the sales and operations planning system using data from the second decentralized ledger interchange object. In another aspect, the method further includes reconciling and synchronizing the second decentralized ledger object received from multiple second computer systems. In another aspect, the method further includes: automatically exporting data from a sales plan, an inventory plan, a customer lead time plan, a new product development plan, a strategic initiative plan, or a financial plan into the first decentralized ledger object; and automatically inputting data from the second decentralized ledger object into the sales plan, the inventory plan, the customer lead time plan, the new product development plan, the strategic initiative plan, or the financial plan. In another aspect, the method further includes automatically updating an electronic commerce application using the second decentralized ledger object. In another aspect, the method further includes coordinating and synchronizing one or more production arrays of data using the first decentralized ledger object or the second decentralized ledger object. In another aspect, the method further includes rationalizing, synchronizing and coordinating two or more independent decentralized distributed concurrent plans the first decentralized ledger object or the second decentralized ledger object.

This embodiment allows non-centralized, asynchronous production planning, supply chain and in particular decentralized S&OP plans to coordinate, synchronize various production arrays of data using the decentralized ledger object. In particular, a production planning S&OP system can be built on top of as the decentralized ledger object as the central basis of communication can allow for independent decentralized distributed concurrent plans to be rationalized, synchronized, coordinated in methods previously impossible when trying to coordinate independent production plans.

Figure 36:
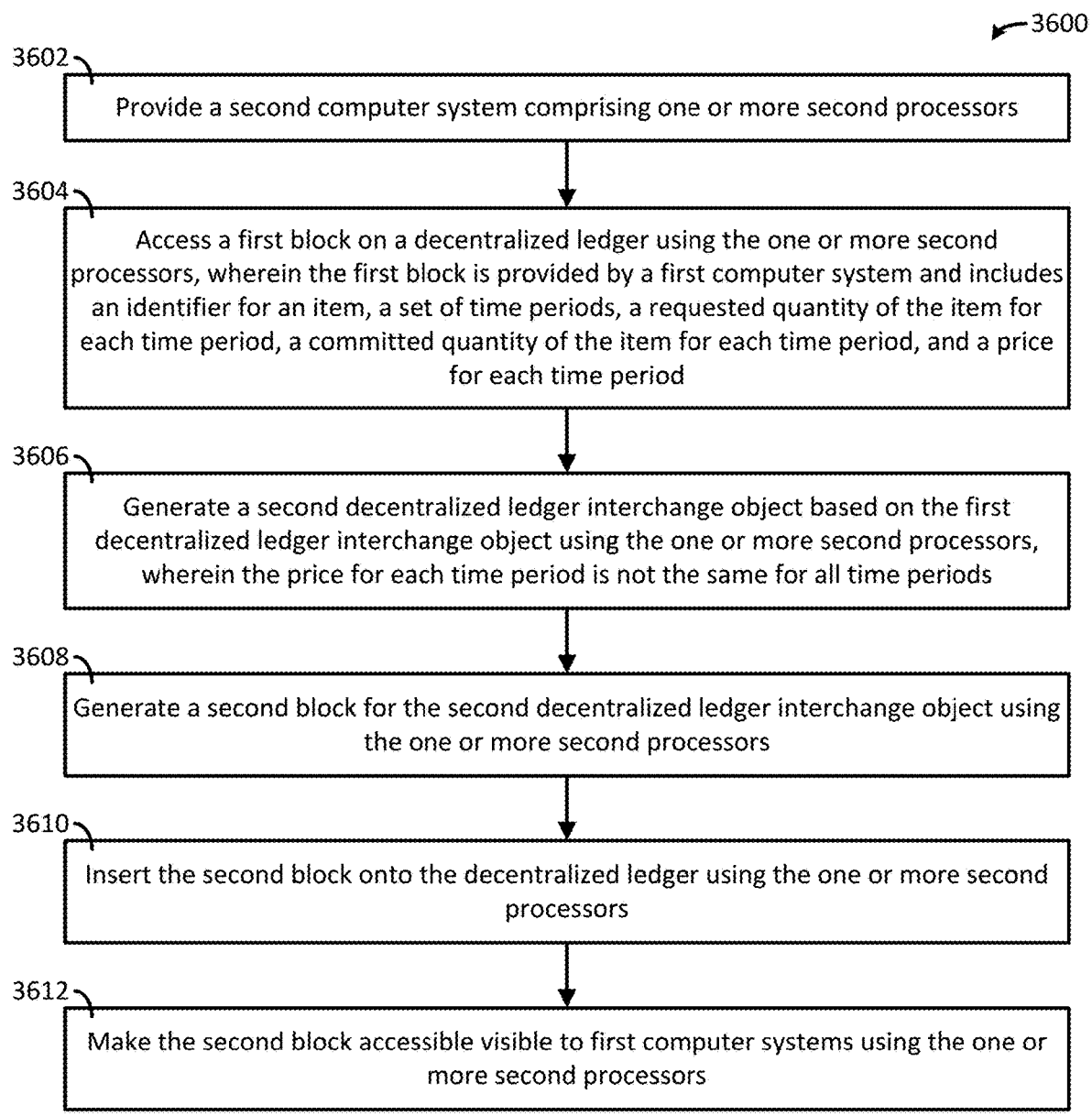
FIG. 36 is a flow chart of a computerized method for time-based pricing in accordance with one embodiment of the present invention.

FIG. 36 is a flow chart of a computerized method 3600 for time-based pricing in accordance with one embodiment of the present invention. A second computer system comprising one or more second processors is provided in block 3602. A first decentralized ledger interchange object in a first block of decentralized ledger is accessed using the one or more second processors in block 3604. The first decentralized ledger interchange object is provided by a first computer system and includes an identifier for an item, a set of time periods, a requested quantity of the item for each time period, a committed quantity of the item for each time period, and a price for each time period. A second decentralized ledger interchange object is generated based on the first decentralized ledger interchange object using the one or more second processors in block 3606. The price for each time period is not the same for all the time periods. A second block for the second decentralized ledger object is generated using the one or more second processors in block 3608. The second block is inserted onto the decentralized ledger using the one or more second processors in block 3610. The second block is made visible to the first computer system in block 3612.

In one aspect, the first and second decentralized ledger objects further comprise one or more terms and conditions, one or more specifications for the item, a shipping and handling price, a tax amount, a link to other data or information stored remotely, or a link to other decentralized ledger interchange objects. In another aspect, the method further includes: generating the first decentralized ledger interchange object using the one or more first processors of the first computer system; generating the first block for the first decentralized ledger interchange object using the one or more first processors; inserting the first block onto the decentralized ledger using the one or more first processors; making the first block visible to one or more second computer systems using the one or more first processors; and using data from the second block to create or modify a manufacturing schedule. In another aspect, the method further includes: generating at least one cryptographic key for the second computer system; encrypting the first block using the cryptographic key; and the cryptographic key enables the one or more second processors to view blocks on the distributed ledger and to insert blocks onto the distributed ledger. In another aspect, the method further includes: inputting the identifier for the item, the set of time periods, and the requested quantity of the item for each time period into the first decentralized ledger interchange object using the one or more processors; and inputting the committed quantity of the item for each time period and the price for each time period into the second decentralized ledger interchange object using the one or more second processors. In another aspect, the method further includes: generating the first decentralized ledger interchange object using data from a sales and operations planning system; and updating the sales and operations planning system using data from the second decentralized ledger interchange object. In another aspect, the method further includes reconciling and synchronizing the second decentralized ledger object received from multiple second computer systems. In another aspect, the method further includes: automatically exporting data from a sales plan, an inventory plan, a customer lead time plan, a new product development plan, a strategic initiative plan, or a financial plan into the first decentralized ledger object; and automatically inputting data from the second decentralized ledger object into the sales plan, the inventory plan, the customer lead time plan, the new product development plan, the strategic initiative plan, or the financial plan. In another aspect, the method further includes automatically updating an electronic commerce application using the second decentralized ledger object. In another aspect, the method further includes organizing a production capacity in pricing blocks using the second decentralized ledger object. In another aspect, the production capacity is within a production facility, a production line within the production facility, a product production across multiple facilities, multiple geographic areas or an entire company.

Time based pricing is an extension of independent S&OP plans ability to reconcile quickly and efficiently. A result of this new capability allows a production facility, a production line within a facility, an entire product production of a item across facilities or entire company to organize their production capacity in pricing blocks and do as such dynamically. To accomplish time based pricing, the owner of the assets production of the product can offer to buyers a bucket/slot of the capacity using the decentralized ledger object. The decentralized ledger object provides a method to request, for example, 10000 units per week for 10 weeks but 50 weeks in the future between weeks 40 and 50. Using the decentralized ledger object, the customer can transmit the request and the owner of the production capacity (much like an airline making a series of flight sin the future offered at a discount price) possible as a simple request. The owner of the capacity can choose to allocate the requested capacity or some subset of it, and can lower the price to reflect the owners reduction of risk in filling that capacity in the future.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the fastener subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process step(s), or limitation(s)) only.

As used herein, the term "or combinations thereof" refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial," or "substantially," refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. A computerized method for time-based pricing comprising:

providing a second computer system comprising one or more second processors;

accessing a first decentralized ledger interchange object in a first block of decentralized ledger using the one or more second processors, wherein the first decentralized ledger interchange object is provided by a first computer system and comprises a first data field for an identifier for an item, a set of second data fields for a set of time periods, a third data fields for a requested quantity of the item for each time period, a set of fourth data fields for a committed quantity of the item for each time period, and a set of fifth data fields for a price for each time period, wherein the set of second data fields are linked to the first data field, each third field is linked to a corresponding second data field, each fourth data field is linked to the corresponding second data field, and each fifth data field is linked to the corresponding second data field;

generating a second decentralized ledger interchange object based on the first decentralized ledger interchange object using the one or more second processors, wherein the price for each time period is not the same for all the time periods;

generating a second block for the second decentralized ledger object using the one or more second processors;

inserting the second block onto the decentralized ledger using the one or more second processors; and making the second block visible to the first computer system.

2. The computerized method of claim 1, wherein the first and second decentralized ledger objects further comprise one or more sixth data fields linked to the first data field, each sixth data field for one or more terms and conditions, one or more specifications for the item, a shipping and handling price, a tax amount, a link to other data or information stored remotely, or a link to other decentralized ledger interchange objects.

3. The computerized method of claim 1, further comprising:

generating the first decentralized ledger interchange object using the one or more first processors of the first computer system;

generating the first block for the first decentralized ledger interchange object using the one or more first processors;

inserting the first block onto the decentralized ledger using the one or more first processors;

making the first block visible to one or more second computer systems using the one or more first processors; and using data from the second block to create or modify a manufacturing schedule.

4. The computerized method of claim 3, further comprising:

generating at least one cryptographic key for the second computer system;

encrypting the first block using the cryptographic key; and the cryptographic key enables the one or more second processors to view blocks on the distributed ledger and to insert blocks onto the distributed ledger.

5. The computerized method of claim 3, further comprising:

inputting the identifier for the item in the first data field, the set of time periods in the set of second data fields, and the requested quantity of the item for each time period in the set of third data fields into the first decentralized ledger interchange object using the one or more first processors; and inputting the committed quantity of the item for each time period in the set of fourth data fields and the price for each time period in the set of fifth data fields into the second decentralized ledger interchange object using the one or more second processors.

6. The computerized method of claim 3, further comprising:

generating the first decentralized ledger interchange object using data from a sales and operations planning system; and updating the sales and operations planning system using data from the second decentralized ledger interchange object.

7. The computerized method of claim 3, further comprising reconciling and synchronizing the second decentralized ledger object received from multiple second computer systems.

8. The computerized method of claim 3, further comprising:
automatically exporting data from a sales plan, an inventory plan, a customer lead time plan, a new product development plan, a strategic initiative plan, or a financial plan into the first decentralized ledger object; and
automatically inputting data from the second decentralized ledger object into the sales plan, the inventory plan, the customer lead time plan, the new product development plan, the strategic initiative plan, or the financial plan.

9. The computerized method of claim 3, further comprising automatically updating an electronic commerce application using the second decentralized ledger object.

10. The computerized method of claim 1, further comprising organizing a production capacity in pricing blocks using the second decentralized ledger object.

11. The computerized method of claim 1, wherein the production capacity is within a production facility, a production line within the production facility, a product production across multiple facilities, multiple geographic areas or an entire company.

12. A computer system that uses a decentralized ledger for time-based pricing, the computer system comprising:
a first computer system comprising one or more first processors;
one or more second computer systems, each second computer system comprising one or more second processors;
the one or more first processors (a) generate a first decentralized ledger interchange object, (b) generate a first block for the first decentralized ledger interchange object, (c) insert the first block onto the decentralized ledger, and (d) make the first block visible to the one or more second computer systems;
the one or more second processors (a) access the first decentralized ledger interchange object in the first block of decentralized ledger, (b) generate a second decentralized ledger interchange object based on the first decentralized ledger interchange object, (c) generate a second block for the second decentralized ledger object, (d) insert the second block onto the decentralized ledger, and (e) make the second block visible to the first computer system;
the first and second decentralized ledger interchange objects comprise a first data field for an identifier for an item, a set of second data fields for a set of time periods, a third data fields for a requested quantity of the item for each time period, a set of fourth data fields for a committed quantity of the item for each time period, and a set of fifth data fields for a price for each time period, wherein the set of second data fields are linked to the first data field, each third field is linked to a corresponding second data field, each fourth data field is linked to the corresponding second data field, and each fifth data field is linked to the corresponding second data field; and
the price for each time period entered by is not the same for all the time periods.

13. The computer system of claim 12, wherein the first and second decentralized ledger objects further comprise one or more sixth data fields linked to the first data field, each sixth data field for one or more terms and conditions, one or more specifications for the item, a shipping and handling price, a tax amount, a link to other data or information stored remotely, or a link to other decentralized ledger interchange objects.

14. The computer system of claim 12, wherein:
the one or more first processors generate at least one cryptographic key for the second computer system, and encrypt the first block using the cryptographic key; and
the cryptographic key enables the one or more second processors to view blocks on the distributed ledger and to insert blocks onto the distributed ledger.

15. The computer system of claim 12, wherein:
the one or more first processors input the identifier for the item in the first data field, the set of time periods in the set of second data fields, and the requested quantity of the item for each time period in the set of third data fields into the first decentralized ledger interchange object; and
the one or more second processors input the committed quantity of the item for each time period in the set of fourth data fields and the price for each time period in the set of fifth data fields into the second decentralized ledger interchange object.

16. The computer system of claim 12, wherein the one or more first processors generate the first decentralized ledger interchange object using data from a sales and operations planning system, and update the sales and operations planning system using data from the second decentralized ledger interchange object.

17. The computer system of claim 12, wherein the one or more first processors reconcile and synchronize the second decentralized ledger object received from multiple second computer systems.

18. The computer system of claim 12, wherein the first decentralized ledger object and the second decentralized ledger object are automatically input into or exported from a sales plan, an inventory plan, a customer lead time plan, a new product development plan, a strategic initiative plan, or a financial plan.

19. The computer system of claim 12, wherein the first decentralized ledger object and the second decentralized ledger object a exported to a static non-network production system or supply chain system as a direct data feed to synchronize future inventory requirements from another party, source, block, node or location.

20. The computer system of claim 12, wherein the second decentralized ledger object is used to automatically update an electronic commerce application.

21. The computer system of claim 12, wherein the decentralized ledger is used as a source of data in a manufacturing process, a supply chain, a sales and operations planning time series plan, or a schedule.

* * * * *